United States Patent
Agranov et al.

(10) Patent No.: US 10,848,693 B2
(45) Date of Patent: Nov. 24, 2020

(54) IMAGE FLARE DETECTION USING ASYMMETRIC PIXELS

(71) Applicant: Apple Inc., Cupertno, CA (US)

(72) Inventors: Gennadiy A. Agranov, San Jose, CA (US); Gershon Rosenblum, Fremont, CA (US); Xiangli Li, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/460,883

(22) Filed: Jul. 2, 2019

(65) Prior Publication Data
US 2020/0029035 A1    Jan. 23, 2020

Related U.S. Application Data

(60) Provisional application No. 62/700,103, filed on Jul. 18, 2018.

(51) Int. Cl.
*H04N 5/357* (2011.01)
*H04N 9/64* (2006.01)

(52) U.S. Cl.
CPC ........... *H04N 5/3572* (2013.01); *H04N 9/646* (2013.01)

(58) Field of Classification Search
CPC ... H04N 5/3572; H04N 9/646; H04N 5/36961
See application file for complete search history.

(56) References Cited

U.S. PATENT DOCUMENTS

| | | | |
|---|---|---|---|
| 4,686,572 A | 8/1987 | Takatsu | |
| 4,686,648 A | 8/1987 | Fossum | |
| 5,105,264 A | 4/1992 | Erhardt et al. | |
| 5,329,313 A | 7/1994 | Keith | |
| 5,396,893 A | 3/1995 | Oberg et al. | |
| 5,471,515 A | 11/1995 | Fossum et al. | |
| 5,541,402 A | 7/1996 | Ackland | |
| 5,550,677 A | 8/1996 | Schofield et al. | |
| 5,781,312 A | 7/1998 | Noda | |

(Continued)

FOREIGN PATENT DOCUMENTS

| | | |
|---|---|---|
| CN | 1630350 | 6/2005 |
| CN | 1774032 | 5/2006 |

(Continued)

OTHER PUBLICATIONS

U.S. Appl. No. 15/699,806, filed Sep. 8, 2017, Li et al.

(Continued)

*Primary Examiner* — Timothy J Henn
(74) *Attorney, Agent, or Firm* — Brownstein Hyatt Farber Schreck, LLP

(57) ABSTRACT

A method for processing an image includes obtaining a set of pixel values captured from a pixel array during an image capture frame. The set of pixel values includes pixel values for a set of asymmetric pixels having different directional asymmetries. The method further includes detecting, using the pixel values for at least the asymmetric pixels and the different directional asymmetries of the asymmetric pixels, a directionality of image flare; and processing an image defined by the set of pixel values in accordance with the detected directionality of image flare. In some embodiments, image flare may be distinguished from noise using the set of pixel values.

25 Claims, 20 Drawing Sheets

(56) References Cited

U.S. PATENT DOCUMENTS

| | | |
|---|---|---|
| 5,841,126 A | 11/1998 | Fossum et al. |
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |
| 6,233,013 B1 | 5/2001 | Hosier et al. |
| 6,348,929 B1 | 2/2002 | Acharya et al. |
| 6,448,550 B1 | 9/2002 | Nishimura |
| 6,528,833 B2 | 3/2003 | Lee et al. |
| 6,541,751 B1 | 4/2003 | Bidermann |
| 6,670,904 B1 | 12/2003 | Yakovlev |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,075,049 B2 | 7/2006 | Rhodes et al. |
| 7,084,914 B2 | 8/2006 | Van Blerkom |
| 7,091,466 B2 | 8/2006 | Bock |
| 7,119,322 B2 | 10/2006 | Hong |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,319,218 B2 | 1/2008 | Krymski |
| 7,332,786 B2 | 2/2008 | Altice |
| 7,342,270 B2 | 3/2008 | Kuwazawa |
| 7,390,687 B2 | 6/2008 | Boettiger |
| 7,415,096 B2 | 8/2008 | Sherman |
| 7,437,013 B2 | 10/2008 | Anderson |
| 7,443,421 B2 | 10/2008 | Stavely et al. |
| 7,446,812 B2 | 11/2008 | Ando et al. |
| 7,471,315 B2 | 12/2008 | Silsby et al. |
| 7,502,054 B2 | 3/2009 | Kalapathy |
| 7,525,168 B2 | 4/2009 | Hsieh |
| 7,554,067 B2 | 6/2009 | Zarnoski et al. |
| 7,555,158 B2 | 6/2009 | Park et al. |
| 7,589,316 B2 | 9/2009 | Dunki-Jacobs |
| 7,622,699 B2 | 11/2009 | Sakakibara et al. |
| 7,626,626 B2 | 12/2009 | Panicacci |
| 7,636,109 B2 | 12/2009 | Nakajima et al. |
| 7,667,400 B1 | 2/2010 | Goushcha |
| 7,671,435 B2 | 3/2010 | Ahn |
| 7,714,292 B2 | 5/2010 | Agarwal et al. |
| 7,728,351 B2 | 6/2010 | Shim |
| 7,733,402 B2 | 6/2010 | Egawa et al. |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,817,198 B2 | 10/2010 | Kang et al. |
| 7,838,956 B2 | 11/2010 | McCarten et al. |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,089,036 B2 | 1/2012 | Manabe et al. |
| 8,089,524 B2 | 1/2012 | Urisaka |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,330,839 B2 | 12/2012 | Compton et al. |
| 8,338,856 B2 | 12/2012 | Tai et al. |
| 8,340,407 B2 | 12/2012 | Kalman |
| 8,350,940 B2 | 1/2013 | Smith et al. |
| 8,355,117 B2 | 1/2013 | Niclass |
| 8,388,346 B2 | 3/2013 | Rantala et al. |
| 8,400,546 B2 | 3/2013 | Itano et al. |
| 8,456,540 B2 | 6/2013 | Egawa |
| 8,456,559 B2 | 6/2013 | Yamashita |
| 8,462,247 B2 | 6/2013 | Kim |
| 8,508,637 B2 | 8/2013 | Han et al. |
| 8,514,308 B2 | 8/2013 | Itonaga et al. |
| 8,520,913 B2 | 8/2013 | Dean |
| 8,546,737 B2 | 10/2013 | Tian et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,619,170 B2 | 12/2013 | Mabuchi |
| 8,629,484 B2 | 1/2014 | Ohri et al. |
| 8,634,002 B2 | 1/2014 | Kita |
| 8,637,875 B2 | 1/2014 | Finkelstein et al. |
| 8,648,947 B2 | 2/2014 | Sato et al. |
| 8,653,434 B2 | 2/2014 | Johnson et al. |
| 8,723,975 B2 | 5/2014 | Solhusvik |
| 8,724,096 B2 | 5/2014 | Gosch et al. |
| 8,730,345 B2 | 5/2014 | Watanabe |
| 8,754,983 B2 | 6/2014 | Sutton |
| 8,755,854 B2 | 6/2014 | Addison et al. |
| 8,759,736 B2 | 6/2014 | Yoo |
| 8,760,413 B2 | 6/2014 | Peterson et al. |
| 8,767,104 B2 | 7/2014 | Makino et al. |
| 8,803,990 B2 | 8/2014 | Smith |
| 8,810,703 B2 | 8/2014 | Mabhuchi |
| 8,817,154 B2 | 8/2014 | Manabe et al. |
| 8,879,686 B2 | 11/2014 | Okada et al. |
| 8,902,330 B2 | 12/2014 | Theuwissen |
| 8,902,341 B2 | 12/2014 | Machida |
| 8,908,073 B2 | 12/2014 | Minagawa |
| 8,923,994 B2 | 12/2014 | Laikari et al. |
| 8,934,030 B2 | 1/2015 | Kim et al. |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,001,251 B2 | 4/2015 | Smith et al. |
| 9,006,641 B2 | 4/2015 | Drader |
| 9,041,837 B2 | 5/2015 | Li |
| 9,017,748 B2 | 6/2015 | Theuwissen |
| 9,054,009 B2 | 6/2015 | Oike et al. |
| 9,058,081 B2 | 6/2015 | Baxter |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |
| 9,100,597 B2 | 8/2015 | Hu |
| 9,106,859 B2 | 8/2015 | Kizuna et al. |
| 9,131,171 B2 | 9/2015 | Aoki et al. |
| 9,151,829 B2 | 10/2015 | Campbell |
| 9,154,750 B2 | 10/2015 | Pang |
| 9,160,949 B2 | 10/2015 | Zhang et al. |
| 9,164,144 B2 | 10/2015 | Dolinsky |
| 9,178,100 B2 | 11/2015 | Webster et al. |
| 9,209,320 B1 | 12/2015 | Webster |
| 9,225,948 B2 | 12/2015 | Hasegawa |
| 9,232,150 B2 | 1/2016 | Kleekajai et al. |
| 9,232,161 B2 | 1/2016 | Suh |
| 9,235,267 B2 | 1/2016 | Burrough et al. |

(56) References Cited

U.S. PATENT DOCUMENTS

| | | |
|---|---|---|
| 9,270,906 B2 | 2/2016 | Peng et al. |
| 9,276,031 B2 | 3/2016 | Wan |
| 9,277,144 B2 | 3/2016 | Kleekajai et al. |
| 9,287,304 B2 | 3/2016 | Park et al. |
| 9,288,380 B2 | 3/2016 | Nomura |
| 9,288,404 B2 | 3/2016 | Papiashvili |
| 9,293,500 B2 | 3/2016 | Sharma et al. |
| 9,312,401 B2 | 4/2016 | Webster |
| 9,313,434 B2 | 4/2016 | Dutton et al. |
| 9,319,611 B2 | 4/2016 | Fan |
| 9,331,116 B2 | 5/2016 | Webster |
| 9,344,649 B2 | 5/2016 | Bock |
| 9,380,245 B1 | 6/2016 | Guidash |
| 9,392,237 B2 | 7/2016 | Toyoda |
| 9,417,326 B2 | 8/2016 | Niclass et al. |
| 9,438,258 B1 | 9/2016 | Yoo |
| 9,445,018 B2 | 9/2016 | Fettig et al. |
| 9,448,110 B2 | 9/2016 | Wong |
| 9,451,887 B2 | 9/2016 | Watson et al. |
| 9,467,553 B2 | 10/2016 | Heo et al. |
| 9,473,706 B2 | 10/2016 | Malone et al. |
| 9,478,030 B1 | 10/2016 | Lecky |
| 9,479,688 B2 | 10/2016 | Ishii |
| 9,490,285 B2 | 11/2016 | Itonaga |
| 9,497,397 B1 | 11/2016 | Kleekajai et al. |
| 9,503,616 B2 | 11/2016 | Taniguchi et al. |
| 9,516,244 B2 | 12/2016 | Borowski |
| 9,538,067 B2 | 1/2017 | Hamada |
| 9,538,106 B2 | 1/2017 | McMahon et al. |
| 9,549,099 B2 | 1/2017 | Fan |
| 9,560,339 B2 | 1/2017 | Borowski |
| 9,584,743 B1 | 2/2017 | Lin et al. |
| 9,584,744 B2 | 2/2017 | Lenchenkov et al. |
| 9,596,420 B2 | 3/2017 | Fan et al. |
| 9,596,423 B1 | 3/2017 | Molgaard |
| 9,609,250 B2 | 3/2017 | Lee et al. |
| 9,639,063 B2 | 5/2017 | Dutton et al. |
| 9,661,210 B2 | 5/2017 | Haneda |
| 9,661,308 B1 | 5/2017 | Wang et al. |
| 9,685,576 B2 | 6/2017 | Webster |
| 9,686,485 B2 | 6/2017 | Agranov et al. |
| 9,700,240 B2 | 7/2017 | Letchner et al. |
| 9,741,754 B2 | 8/2017 | Li et al. |
| 9,749,556 B2 | 8/2017 | Fettig et al. |
| 9,754,994 B2 | 9/2017 | Koo et al. |
| 9,774,318 B2 | 9/2017 | Song |
| 9,781,368 B2 | 10/2017 | Song |
| 9,831,283 B2 | 11/2017 | Shepard et al. |
| 9,857,469 B2 | 1/2018 | Oggier et al. |
| 9,870,053 B2 | 1/2018 | Modarres et al. |
| 9,888,198 B2 | 2/2018 | Mauritzson et al. |
| 9,894,304 B1 | 2/2018 | Smith |
| 9,912,883 B1 | 3/2018 | Agranov et al. |
| 9,915,733 B2 | 3/2018 | Fried et al. |
| 9,952,323 B2 | 4/2018 | Deane |
| 9,973,678 B2 | 5/2018 | Mandelli et al. |
| 10,044,954 B2 | 8/2018 | Ikeda et al. |
| 10,104,318 B2 | 10/2018 | Smith et al. |
| 10,120,446 B2 | 11/2018 | Pance et al. |
| 10,136,090 B2 | 11/2018 | Vogelsang et al. |
| 10,145,678 B2 | 12/2018 | Wang et al. |
| 10,153,310 B2 | 12/2018 | Zhang et al. |
| 10,205,904 B2 | 2/2019 | Kobayashi |
| 10,249,660 B2 | 4/2019 | Guidash et al. |
| 10,263,032 B2 | 4/2019 | Wan |
| 10,271,037 B2 | 4/2019 | Oh |
| 10,285,626 B1 | 5/2019 | Kestelli et al. |
| 10,334,181 B2 | 6/2019 | Guenter et al. |
| 10,440,301 B2 | 10/2019 | Li et al. |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2009/0219266 A1 | 9/2009 | Lim et al. |
| 2010/0110018 A1 | 5/2010 | Faubert et al. |
| 2010/0245631 A1* | 9/2010 | Hoda .................... G03B 13/36 |
| | | 348/241 |
| 2011/0080500 A1 | 4/2011 | Wang et al. |
| 2011/0156197 A1 | 6/2011 | Tivarus et al. |
| 2011/0164162 A1 | 7/2011 | Kato |
| 2012/0092541 A1 | 4/2012 | Tuulos et al. |
| 2012/0162632 A1 | 6/2012 | Dutton |
| 2013/0002902 A1* | 1/2013 | Ito ....................... H04N 5/3572 |
| | | 348/224.1 |
| 2013/0147981 A1 | 6/2013 | Wu |
| 2013/0147986 A1 | 6/2013 | Chen |
| 2014/0022439 A1* | 1/2014 | Aoki ..................... G02B 7/346 |
| | | 348/347 |
| 2014/0049683 A1 | 2/2014 | Guenter et al. |
| 2014/0071321 A1 | 3/2014 | Seyama |
| 2014/0132528 A1 | 5/2014 | Catton |
| 2014/0231630 A1 | 8/2014 | Rae et al. |
| 2015/0062391 A1 | 3/2015 | Murata |
| 2015/0277559 A1 | 10/2015 | Vescovi et al. |
| 2015/0312479 A1 | 10/2015 | McMahon et al. |
| 2016/0050379 A1 | 2/2016 | Jiang et al. |
| 2016/0191826 A1* | 6/2016 | Furuya ................. H04N 5/217 |
| | | 348/246 |
| 2016/0218236 A1 | 7/2016 | Dhulla et al. |
| 2016/0219232 A1 | 7/2016 | Murata |
| 2016/0274237 A1 | 9/2016 | Stutz |
| 2017/0047363 A1 | 2/2017 | Choi et al. |
| 2017/0052065 A1 | 2/2017 | Sharma et al. |
| 2017/0082746 A1 | 3/2017 | Kubota et al. |
| 2017/0142325 A1 | 5/2017 | Shimokawa et al. |
| 2017/0170229 A1 | 6/2017 | Oh et al. |
| 2017/0364736 A1 | 12/2017 | Ollila |
| 2017/0373106 A1 | 12/2017 | Li et al. |
| 2018/0090526 A1 | 3/2018 | Mandai et al. |
| 2018/0090536 A1 | 3/2018 | Mandai et al. |
| 2018/0109742 A1 | 4/2018 | Agranov et al. |
| 2018/0209846 A1 | 7/2018 | Mandai et al. |
| 2018/0316878 A1* | 11/2018 | Zhou ................. H01L 27/14607 |
| 2018/0338096 A1* | 11/2018 | Matsunaga .......... H04N 5/3572 |
| 2019/0018119 A1 | 1/2019 | Laifenfeld et al. |
| 2019/0027674 A1 | 1/2019 | Zhang et al. |
| 2020/0029043 A1 | 1/2020 | McMahon |

FOREIGN PATENT DOCUMENTS

| | | |
|---|---|---|
| CN | 1833429 | 9/2006 |
| CN | 1842138 | 10/2006 |
| CN | 1947414 | 4/2007 |
| CN | 101189885 | 5/2008 |
| CN | 101221965 | 7/2008 |
| CN | 101233763 | 7/2008 |
| CN | 101472059 | 7/2009 |
| CN | 101567977 | 10/2009 |
| CN | 101622859 | 1/2010 |
| CN | 101739955 | 6/2010 |
| CN | 101754029 | 6/2010 |
| CN | 101803925 | 8/2010 |
| CN | 102036020 | 4/2011 |
| CN | 102067584 | 5/2011 |
| CN | 102208423 | 10/2011 |
| CN | 102451160 | 5/2012 |
| CN | 102668542 | 9/2012 |
| CN | 102820309 | 12/2012 |
| CN | 102821255 | 12/2012 |
| CN | 103024297 | 4/2013 |
| CN | 103051843 | 4/2013 |
| CN | 103329513 | 9/2013 |
| CN | 103546702 | 1/2014 |
| CN | 104041009 | 9/2014 |
| CN | 104052919 | 9/2014 |
| CN | 204761615 | 11/2015 |

(56) References Cited

FOREIGN PATENT DOCUMENTS

| | | |
|---|---|---|
| CN | 205211754 | 5/2016 |
| DE | 102010060527 | 4/2012 |
| EP | 1763228 | 3/2007 |
| EP | 2023611 | 2/2009 |
| EP | 2107610 | 10/2009 |
| EP | 2230690 | 9/2010 |
| EP | 2512126 | 10/2012 |
| EP | 2787531 | 10/2014 |
| JP | S61123287 | 6/1986 |
| JP | 2000059697 | 2/2000 |
| JP | 2001211455 | 8/2001 |
| JP | 2001358994 | 12/2001 |
| JP | 2004111590 | 4/2004 |
| JP | 2005318504 | 11/2005 |
| JP | 2006287361 | 10/2006 |
| JP | 2007504670 | 3/2007 |
| JP | 2007516654 | 6/2007 |
| JP | 2008507908 | 3/2008 |
| JP | 2008271280 | 11/2008 |
| JP | 2008543061 | 11/2008 |
| JP | 2009021809 | 1/2009 |
| JP | 2009159186 | 7/2009 |
| JP | 2009212909 | 9/2009 |
| JP | 2009296465 | 12/2009 |
| JP | 2010080604 | 4/2010 |
| JP | 2010114834 | 5/2010 |
| JP | 2011040926 | 2/2011 |
| JP | 2011049697 | 3/2011 |
| JP | 2011091775 | 5/2011 |
| JP | 2011216970 | 10/2011 |
| JP | 2011217315 | 10/2011 |
| JP | 2011097746 | 12/2011 |
| JP | 2012010306 | 1/2012 |
| JP | 2012019516 | 1/2012 |
| JP | 2012513160 | 6/2012 |
| JP | 2013051523 | 3/2013 |
| JP | 2013070240 | 4/2013 |
| JP | 2013529035 | 7/2013 |
| JP | 2014081254 | 5/2014 |
| JP | 2016145776 | 8/2016 |
| KR | 20030034424 | 5/2003 |
| KR | 20030061157 | 7/2003 |
| KR | 20050103732 | 11/2005 |
| KR | 2008/0069851 | 7/2008 |
| KR | 20100008239 | 1/2010 |
| KR | 20100065084 | 6/2010 |
| KR | 20130074459 | 7/2013 |
| TW | 200520551 | 6/2005 |
| TW | 200803481 | 1/2008 |
| TW | 201110689 | 3/2011 |
| TW | 201301881 | 1/2013 |
| WO | WO 05/041304 | 5/2005 |
| WO | WO 06/014641 | 2/2006 |
| WO | WO 06/130443 | 12/2006 |
| WO | WO 07/049900 | 5/2007 |
| WO | WO 10/120945 | 10/2010 |
| WO | WO 12/011095 | 1/2012 |
| WO | WO 12/032353 | 3/2012 |
| WO | WO 12/053363 | 4/2012 |
| WO | WO 12/088338 | 6/2012 |
| WO | WO 12/122572 | 9/2012 |
| WO | WO 12/138687 | 10/2012 |
| WO | WO 13/008425 | 1/2013 |
| WO | WO 13/179018 | 12/2013 |
| WO | WO 13/179020 | 12/2013 |
| WO | WO 17/112416 | 6/2017 |

OTHER PUBLICATIONS

U.S. Appl. No. 15/879,350, filed Jan. 24, 2018, Mandai et al.
U.S. Appl. No. 15/880,285, filed Jan. 25, 2018, Laifenfeld et al.
U.S. Appl. No. 16/226,491, filed Dec. 19, 2018, McMahon.
Aoki, et al., "Rolling-Shutter Distortion-Free 3D Stacked Image Sensor with −160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Charbon, et al., SPAD-Based Sensors, *TOF Range-Imaging Cameras*, F. Remondino and D. Stoppa (eds.), 2013, Springer-Verlag Berlin Heidelberg, pp. 11-38.
Cox, "Getting histograms with varying bin widths," http://www.stata.com/support/faqs/graphics/histograms-with-varying-bin-widths/, Nov. 13, 2017, 5 pages.
Elgendi, "On the Analysis of Fingertip Photoplethysmogram Signals," *Current Cardiology Reviews*, 2012, vol. 8, pp. 14-25.
Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.
Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Gallivanoni, et al., "Progress n Quenching Circuits for Single Photon Avalanche Diodes," *IEEE Transactions on Nuclear Science*, vol. 57, No. 6, Dec. 2010, pp. 3815-3826.
Han, et al., "Artifacts in wearable photoplethysmographs during daily life motions and their reduction with least mean square based active noise cancellation method," *Computers in Biology and Medicine*, 2012, vol. 42, pp. 387-393.
Jahromi et al., "A Single Chip Laser Radar Receiver with a 9×9 SPAD Detector Array and a 10-channel TDC," 2013 Proceedings of the ESSCIRC, IEEE, Sep. 14, 2015, pp. 364-367.
Leslar, et al., "Comprehensive Utilization of Temporal and Spatial Domain Outlier Detection Methods for Mobile Terrestrial LiDAR Data," *Remote Sensing*, 2011, vol. 3, pp. 1724-1742.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Mota, et al., "A flexible multi-channel high-resolution Time-to-Digital Converter ASIC," *Nuclear Science Symposium Conference Record IEEE*, 2000, Engineering School of Geneva, Microelectronics Lab, Geneva, Switzerland, 8 pages.
Niclass, et al., "Design and Characterization of a CMOS 3-D Image Sensor Based on Single Photon Avalanche Diodes," *IEEE Journal of Solid-State Circuits*, vol. 40, No. 9, Sep. 2005, pp. 1847-1854.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Schwarzer, et al., On the determination of film stress from substrate bending: STONEY'S formula and its limits, Jan. 2006, 19 pages.
Shen et al., "Stresses, Curvatures, and Shape Changes Arising from Patterned Lines on Silicon Wafers," Journal of Applied Physics, vol. 80, No. 3, Aug. 1996, pp. 1388-1398.
Shin, et al., "Photon-Efficient Computational 3D and Reflectivity Imaging with Single-Photon Detectors," IEEE International Conference on Image Processing, Paris, France, Oct. 2014, 11 pages.
Tisa, et al., "Variable-Load Quenching Circuit for single-photon avalanche diodes," Optics Express, vol. 16, No. 3, Feb. 4, 2008, pp. 2232-2244.
Ullrich, et al., "Linear LIDAR versus Geiger-mode LIDAR: Impact on data properties and data quality," *Laser Radar Technology and Applications XXI*, edited by Monte D. Turner, Gary W. Kamerman, Proc. of SPIE, vol. 9832, 983204, 2016, 17 pages.
Yan, et al., "Reduction of motion artifact in pulse oximetry by smoothed pseudo Wigner-Ville distribution," *Journal of NeuroEngineering and Rehabilitation*, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

\* cited by examiner

IMAGE FLARE DETECTION USING ASYMMETRIC PIXELS

CROSS-REFERENCE TO RELATED APPLICATION(S)

This application is a nonprovisional of and claims the benefit under 35 U.S.C. 119(e) of U.S. Provisional Patent Application No. 62/700,103, filed Jul. 18, 2018, and entitled "Camera Flare Determination Using Asymmetric Pixels," which is incorporated herein by reference as if fully disclosed herein.

FIELD

The described embodiments relate generally to a device having a camera or other image capture device. More particularly, the described embodiments relate to detection of image flare using asymmetric pixels.

BACKGROUND

Cameras and other image capture devices often include a set of lenses that focus light or other electromagnetic radiation on an image sensor. The image sensor, in some examples, may be a complementary metal-oxide-semiconductor (CMOS) image sensor or a charge-coupled device (CCD) image sensor. The set of lenses may be moved, and the relationship between one or more lenses and the image sensor changed, to focus an image on the image sensor.

Some image sensors include a set of asymmetric pixels (ASPs), which are sometimes referred to as phase detection auto-focus (PDAF) pixels. Asymmetric pixels include elements, such as shields or lenses, that restrict the directions or incident angles of light that impinge on a photodetector of the pixel. Asymmetric pixels having out-of-phase directional asymmetries can therefore provide focus information to an image processor, enabling the image processor to quickly determine whether an image is in-focus or out-of-focus, and enabling the image processor to provide feedback to an auto-focus mechanism that adjusts a relationship between the image sensor and one or more lenses that focus an image on the image sensor. When an image is in-focus, asymmetric pixels have gains (ratios of asymmetric pixel values to symmetric pixel values) that are almost independent of scene content. When an image is out-of-focus, asymmetric pixels having different directional asymmetries have gains that differ in magnitude and polarity, thereby indicating an out-of-focus condition.

Image flare results from stray light reflecting within a camera module and arriving at an image sensor at angles that are far from intended incident angles (e.g., outside the intended ranges of incident angles that pixels are expected to receive light). Due to angular mismatches, image flare causes asymmetric pixel gains to deviate far outside the gains expected under both in-focus and out-of-focus conditions. Asymmetric pixels can therefore be used to detect image flare.

SUMMARY

Embodiments of the systems, devices, methods, and apparatus described in the present disclosure are directed to identifying regions of a pixel array affected by image flare, detecting a directionality (or directionalities) of image flare, and processing images to remove, enhance, or reshape image flare using directional processing techniques. Also described are systems, devices, methods, and apparatus directed to distinguishing image flare from noise.

In a first aspect, the present disclosure describes a method for processing an image. The method may include obtaining a set of pixel values captured from a pixel array during an image capture frame. The set of pixel values may include pixel values for a set of asymmetric pixels having different directional asymmetries (where asymmetric pixels having different directional asymmetries are asymmetric pixels that are configured or oriented within a pixel array to restrict light arriving at different subsets of incident angles). The method may also include detecting, using the pixel values for at least the asymmetric pixels and the different directional asymmetries of the asymmetric pixels, a directionality of image flare; and processing an image defined by the set of pixel values in accordance with the detected directionality of image flare.

In another aspect, the present disclosure describes an electronic device. The electronic device may include a pixel array and a processor. The pixel array may include asymmetric pixels having different directional asymmetries. The processor may be configured to obtain a set of pixel values captured from the pixel array during an image capture frame. The set of pixel values may include pixel values for the asymmetric pixels. The processor may also be configured to evaluate the pixel values for at least the asymmetric pixels to identify a region of the pixel array affected by image flare; and to detect, using the pixel values for at least the asymmetric pixels and the different directional asymmetries of the asymmetric pixels, a directionality of image flare.

In still another aspect of the disclosure, an imaging system is described. The imaging system may include a pixel array and a processor. The pixel array may include a first set of asymmetric pixels distributed across the pixel array and having a first directional asymmetry, and a second set of asymmetric pixels distributed across the pixel array and having a second directional asymmetry. The second directional asymmetry may be different from the first directional asymmetry. The processor may be configured to determine that a first set of pixel values obtained from the first set of asymmetric pixels, during an image capture frame, satisfies an image flare threshold. The processor may also be configured to evaluate a second set of pixel values obtained from the second set of asymmetric pixels, during the image capture frame, to determine whether the first set of pixel values is indicative of image flare or noise in an image captured by the pixel array during the image capture frame.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
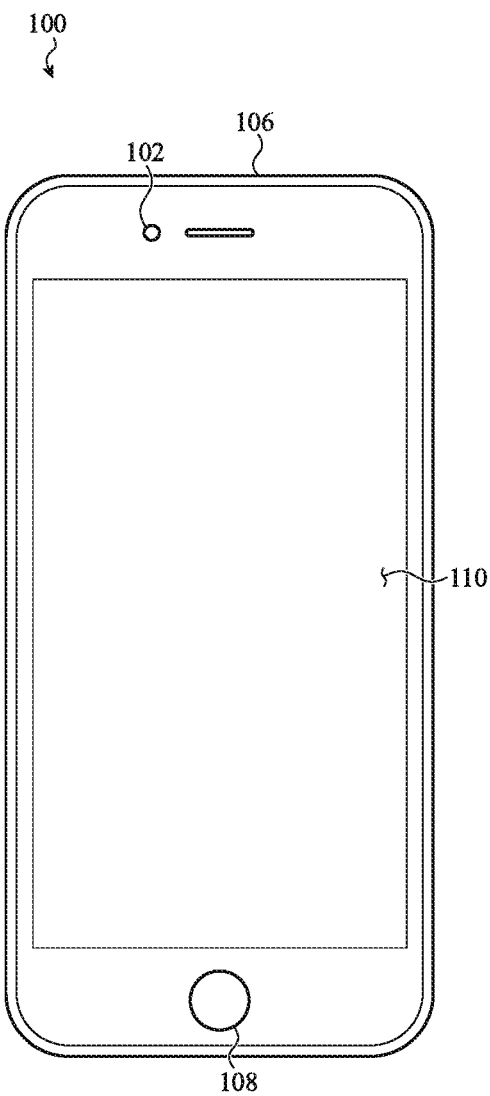
FIGS. 1A-1B show front and rear views of an electronic device that includes one or more image capture devices (e.g., cameras)

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

When light rays coming from a bright source of light (such as the sun or artificial light) directly reach the front element of a camera lens, they can reflect and bounce off different lens elements within the camera, the camera's diaphragm, and even the camera's image sensor. These light rays can potentially degrade image quality and create unwanted objects in images. Better known as "image flare," "lens flare," or just "flare," the effects can impact images in a number of ways. For example, image flare can drastically reduce image contrast by introducing haze in different colors. Image flare can also introduce circular or semi-circular halos or "ghosts" in an image, and even introduce odd-shaped semi-transparent objects of various color intensities. It is useful to detect the region(s) of an image affected by image flare, such that further image processing can be performed, and image quality can be improved or intentionally enhanced.

Described herein are techniques that use pixel values (or other information) obtained from asymmetric pixels having different directional asymmetries to identify regions of a pixel array affected by image flare, and/or to detect a directionality or directionalities of image flare. In some cases, image flare may effect more than one region of an image, or have more than one cause that effects a single region, or have more than one cause that effects different regions in the same or different ways. As examples, a directionality of image flare may be an indicator of the direction to a cause of image flare, or an indicator of an average incident angle (or other metric) of the photons that are causing image flare within a region of a pixel array (including the pixel array as a whole). In some cases, a directionality (or directionalities) of image flare may be representative of, or used to determine (e.g., calculate), the direction(s) to one or more causes of image flare.

In some cases, an image may be processed to remove, enhance, or reshape image flare using directional processing techniques (e.g., techniques that are tuned to process image flare using one or more directionalities of image flare and/or directions to causes of image flare (and in some cases, one or more indicators of the region(s) within a pixel array that are affected by image flare)). Also described are techniques for distinguishing image flare from noise using pixel values for asymmetric pixels. These and other techniques are described with reference to FIGS. 1-15. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

Figure 1B:
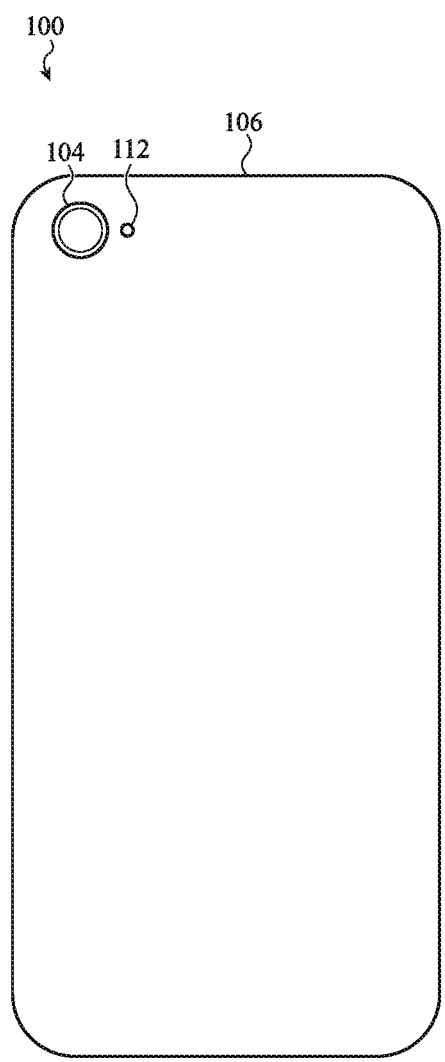

Referring now to FIGS. 1A & 1B, there are shown front and rear views of an electronic device 100 that includes one or more image capture devices (e.g., cameras). The electronic device 100 includes a first camera 102, a second camera 104, an enclosure 106, a display 110, an input/output (I/O) device 108, and a flash 112 or light source for the second camera 104. Each of the first camera 102 and second camera 104 may be associated with a respective image sensor. The electronic device 100 may also include one or more internal components (not shown) typical of a computing or electronic device, such as, for example, one or more processors, memory components, network interfaces, and so on.

In the illustrated embodiment, the electronic device 100 is implemented as a smartphone. Other embodiments, however, are not limited to this construction. Other types of computing or electronic devices which may include a camera or image sensor include, but are not limited to, a netbook or laptop computer, a tablet computer, a digital camera, a scanner, a video recorder, a watch (or other wearable electronic device), a drone, a vehicle navigation system, and so on.

As shown in FIGS. 1A & 1B, the enclosure 106 may form an outer surface or partial outer surface and protective case for the internal components of the electronic device 100, and may at least partially surround the display 110. The enclosure 106 may be formed of one or more components operably connected together, such as a front piece and a back piece. Alternatively, the enclosure 106 may be formed of a single piece operably connected to the display 110.

The I/O device 108 may be implemented with any type of input or output device. By way of example only, the I/O device 108 may be a switch, a button, a capacitive sensor, or other input mechanism. The I/O device 108 allows a user to interact with the electronic device 100. For example, the I/O device 108 may be a button or switch to alter the volume, return to a home screen, and the like. The electronic device may include one or more input devices or output devices, and each device may have a single input, output, or I/O function, or some devices may have multiple I/O functions. In some embodiments, the I/O device 108 may be incorporated into the display 110, the first camera 102, or an audio I/O device.

The display 110 may be operably or communicatively connected to the electronic device 100. The display 110 may be implemented as any suitable type of display, such as a high resolution display or an active matrix color liquid crystal display (LCD). The display 110 may provide a visual output for the electronic device 100 or function to receive user inputs to the electronic device 100 (or provide user outputs from the electronic device 100). For example, the display 110 may display images captured by the first camera 102 or the second camera 104. In some embodiments, the display 110 may include a multi-touch capacitive sensing touchscreen that is operable to detect one or more user inputs.

The first and second cameras 102, 104 may be any type of cameras, and may be sensitive to visible light, infrared light, or other types of electromagnetic radiation. The cameras 102, 104 may be the same type of camera or different types of cameras. In some examples, one or both of the first or second cameras 102, 104 may include a lens or lens stack (i.e., a stack of multiple lenses) that is positioned to direct light onto an image sensor of the camera. The camera and/or a processor, controller, circuit and/or mechanical actuator associated with the camera, may be configured to actuate movement between the lens and image sensor to provide one or more of an autofocus, image stabilization, or zoom operation. Movement between the lens and image sensor may be achieved by moving a lens, the image sensor, both a lens and the image sensor, and/or a combination of lenses in a lens stack.

Figure 2:
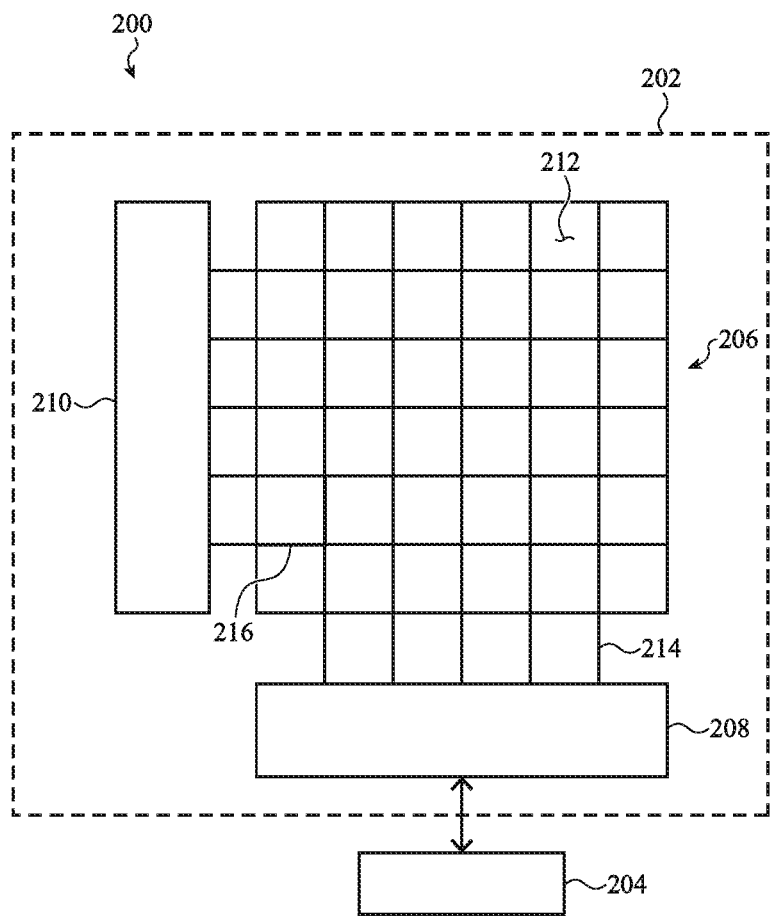
FIG. 2 shows a plan view of one example of an image sensor.

FIG. 2 shows a plan view of one example of an imaging system 200, such as an imaging system associated with one of the image capture devices or cameras described with reference to FIGS. 1A & 1B. The imaging system 200 may include an image sensor 202 and an image processor 204. The image sensor 202 may include a pixel array 206 (e.g., an imaging area), a column select circuit 208, and a row select circuit 210. The pixel array 206 may be implemented as a pixel array that includes a plurality of pixels 212. The pixels 212 may be same colored pixels (e.g., for a monochrome pixel array 206) or differently colored pixels (e.g., for a multi-color pixel array 206). In the illustrated embodiment, the pixels 212 are arranged in rows and columns. However, other embodiments are not limited to this configuration. The pixels in a pixel array may be arranged in any suitable configuration, such as, for example, a hexagonal configuration.

The pixel array 206 may be in communication with the column select circuit 208 through one or more column select lines 214, and with the row select circuit 210 through one or more row select lines 216. The row select circuit 210 may selectively activate a particular pixel or group of pixels, such as all of the pixels 212 in a particular row. The column select circuit 208 may selectively receive the data output from a selected pixel or group of pixels (e.g., all of the pixels 212 in a particular row).

The row select circuit 210 and/or column select circuit 208 may be in communication with the image processor 204. The image processor 204 may process data received from the pixels 212 and provide the data to another processor (e.g., a system processor) and/or other components of a device (e.g., other components of the electronic device 100). In some embodiments, the image processor 204 may be incorporated into the system processor. Alternatively, the image processor 204 and/or some or all of the image processing operations may be integrated directly into the image sensor 202. The image processor 204 may receive pixel values from some or all of the pixels 212, and may process some or all of the pixel values to generate an image.

Figure 3:
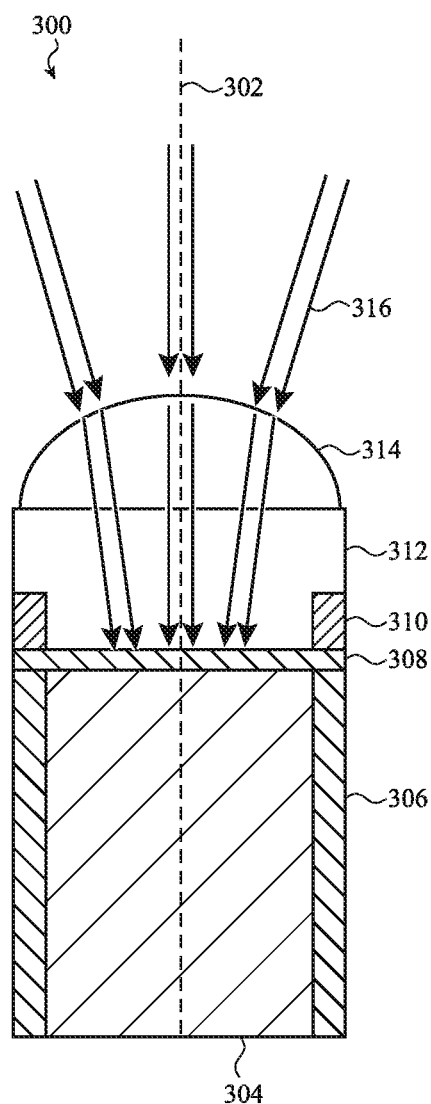
FIG. 3 shows an example longitudinal cross-section of a symmetric pixel.

FIG. 3 shows an example longitudinal cross-section of a pixel 300 (i.e., a cross-section along a cut line perpendicular to an image plane). A transverse cross-section of the pixel 300 (i.e., a cross-section along a cut line parallel to the image plane) may be circular, square, rectangular, oval, or otherwise-shaped, and may be uniform or vary along a longitudinal axis 302 of the pixel 300. The pixel 300 is a symmetric pixel, meaning that each longitudinal cross-section of the pixel 300 is symmetric about the longitudinal axis 302 of the pixel 300, which longitudinal axis 302 is typically parallel to an optical axis of a camera. In some examples, one or more of the pixels 212 included in the pixel array 206 described with reference to FIG. 2 may be configured the same as, or similarly to, the pixel 300.

The pixel 300 may include a photodetector 304 or other photosensitive element formed on or in a substrate layer. The photodetector 304 may be laterally surrounded by an electromagnetic radiation isolator 306 (e.g., implant isolation or physical trench isolation). The electromagnetic radiation isolator 306 reduces the probability that electromagnetic radiation received by the photodetector 304 is also received by adjacent (or neighbor) photodetectors in a pixel array. An optional optical element 308 (e.g., a coating) may be disposed on an outward-facing surface of the photodetector 304, and a symmetric shield 310 (e.g., a metal shield) may be disposed on the optical element 308 over an outward-facing edge of the electromagnetic radiation isolator 306. The symmetric shield may be positioned over or around a perimeter of the photodetector 304, and is symmetric about the longitudinal axis 302. The shield 310 may reduce the probability that electromagnetic radiation received through the microlens 314 is received by one or more adjacent pixels.

An optional color filter 312 may be disposed on or over the photodetector 304 (or on the optical element 308), or on or over at least a central portion of the photodetector 304. In some examples, the color filter 312 may be a red, blue, or green filter forming part of a Bayer pattern color filter, and other pixels within a pixel array may be associated with the same or other color filters. In some examples, the color filter 312 may form part of another type of color filter for a pixel array (e.g., a CMYK color filter), or the color filter 312 may form part of a panchromatic or other type of filter for a pixel array. A lens (e.g., a microlens 314) may be positioned or disposed on a side of the color filter 312 opposite the photodetector 304.

During an image capture frame of an image sensor including the pixel 300, the pixel 300 may be activated and deactivated one or more times to start and stop one or more integration periods in which charge is collected by the photodetector 304. Electromagnetic radiation 316 (e.g., light) received by the photodetector 304 may initially impinge on the microlens 314. The microlens 314 may tend to focus or collimate the electromagnetic radiation 316. Electromagnetic radiation 316 that passes through the microlens 314 may be filtered by the color filter 312 such that one or a range of wavelengths of electromagnetic radiation pass through the color filter 312, and other wavelengths of electromagnetic radiation are reflected, redirected, or absorbed by the color filter 312. Photons of electromagnetic radiation 316 received by the photodetector 304 may converted into electron-hole pairs, and the electrons (for electron collected devices) or holes (for hole collected devices) may be converted to an analog voltage using an in-pixel amplifier. The analog voltage may then be converted to a digital signal by an analog-to-digital converter (ADC).

Charge integrated by the pixel 300 may be read out of a pixel array as described with reference to FIG. 2.

Image flare may affect the charge integrated by the photodetector 304. For example, strong rays of light received from a source of image flare (e.g., the sun or a bright lamp) may not only reflect at unintended angles within a camera module as a whole, but may reflect in a manner that causes unintended light to be received by the photodetector 304 during integration, for example, by reflecting between the microlens 314 and the optical element 308, within the microlens 314 or optical element 318, or at various interfaces between the microlens 314, color filter 312, shield, optical element 308, and photodetector 304.

Figure 4A:
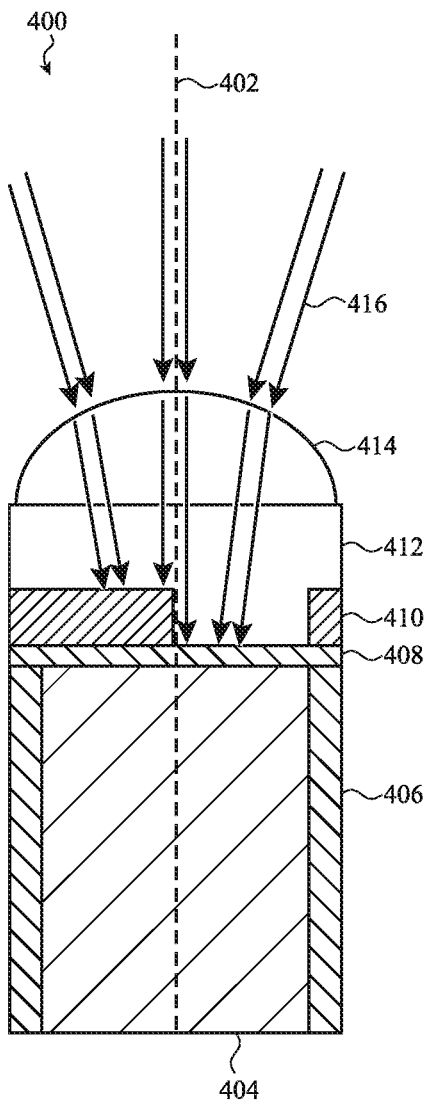
FIGS. 4A & 4B show example longitudinal cross-sections of asymmetric pixels.

FIG. 4A shows an example longitudinal cross-section of another pixel 400. Similarly to the pixel 300 described with reference to FIG. 3, a transverse cross-section of the pixel 400 may be circular, square, rectangular, oval, or otherwise-shaped, and may be uniform or vary along a longitudinal axis of the pixel. The pixel 400 is an asymmetric pixel, meaning that at least one longitudinal cross-sections of the pixel 400 is asymmetric about a longitudinal axis 402 of the pixel 400, which longitudinal axis 402 is typically parallel to an optical axis of a camera. The asymmetry results in the pixel having different sensitivities to incoming light, depending on the side of the longitudinal axis 402 on which the light is incident. In some examples, one or more of the pixels 212 included in the pixel array 206 described with reference to FIG. 2 may be configured the same as, or similarly to, the pixel 400.

The pixel 400 may include a photodetector 404 or other photosensitive element formed on or in a substrate layer. The photodetector 404 may be laterally surrounded by an electromagnetic radiation isolator 406 (e.g., implant isolation or physical trench isolation). The electromagnetic radiation isolator 406 reduces the probability that electromagnetic radiation received by the photodetector 404 is also received by adjacent (or neighbor) photodetectors in a pixel array. An optional optical element 408 (e.g., a coating) may be disposed on an outward-facing surface of the photodetector 404, and an asymmetric shield 410 (e.g., a metal shield) may be disposed on the optical element 408 over an outward-facing edge of the electromagnetic radiation isolator 406. The asymmetric shield may be positioned over or around a perimeter of the photodetector 404, and over more of one side of the photodetector 404 than the other. For example, in the cross-section shown in FIG. 4A, the shield 410 is shown to be disposed over the entire left half of the photodetector 404, but only around a perimeter of the right half of the photodetector 404. In addition to providing a directional asymmetry for the pixel 400, the shield 410 may reduce the probability that electromagnetic radiation received through the microlens 414 is received by one or more adjacent pixels. The shield 410 also tends to block electromagnetic radiation 416 (e.g., light) arriving at the pixel 400 from particular directions (e.g., directions left of the pixel's longitudinal axis 402), or at particular incident angles (e.g., left of pixel incident angles), from impinging on the photodetector 404. In some examples, the shield 410 may be provided in a tungsten (W) or copper/aluminum (Cu/Al) layer.

An optional color filter 412 may be disposed on or over the photodetector 404 (or on the optical element 408), or on or over at least the portion of the photodetector 404 that is not blocked by the shield 410. In some examples, the color filter 410 may be a red, blue, or green filter forming part of a Bayer pattern color filter, and other pixels within a pixel array may be associated with the same or other color filters. In some examples, the color filter 410 may form part of another type of color filter for a pixel array (e.g., a CMYK color filter), or the color filter 410 may form part of a panchromatic or other type of filter for a pixel array. A lens (e.g., a microlens 414) may be positioned or disposed on a side of the color filter 410 opposite the photodetector 404.

In some embodiments, the pixel 400 may be configured similarly to the pixel 300 described with reference to FIG. 3, but for the extent to which the shield 410 blocks electromagnetic radiation 416 from impinging on the photodetector 404. The pixel 400 may also be operated (activated/deactivated/read) similarly to the pixel 300 described with reference to FIG. 3. The pixel 400 may at times be referred to as a metal shield pixel, an asymmetric metal pixel, or a left-shielded asymmetric pixel (e.g., due to the pixel having more shield coverage on the left of the longitudinal axis 402 than on the right of the longitudinal axis 402).

Image flare may affect the charge integrated by the photodetector 404. For example, strong rays of light received from a source of image flare (e.g., the sun or a bright lamp) may not only reflect at unintended angles within a camera module as a whole, but may reflect in a manner that causes unintended light to be received by the photodetector 404 during integration, for example, by reflecting between the microlens 414 and the optical element 408, within the microlens 414 or optical element 418, or at various interfaces between the microlens 414, color filter 412, shield, optical element 408, and photodetector 404.

Figure 4B:
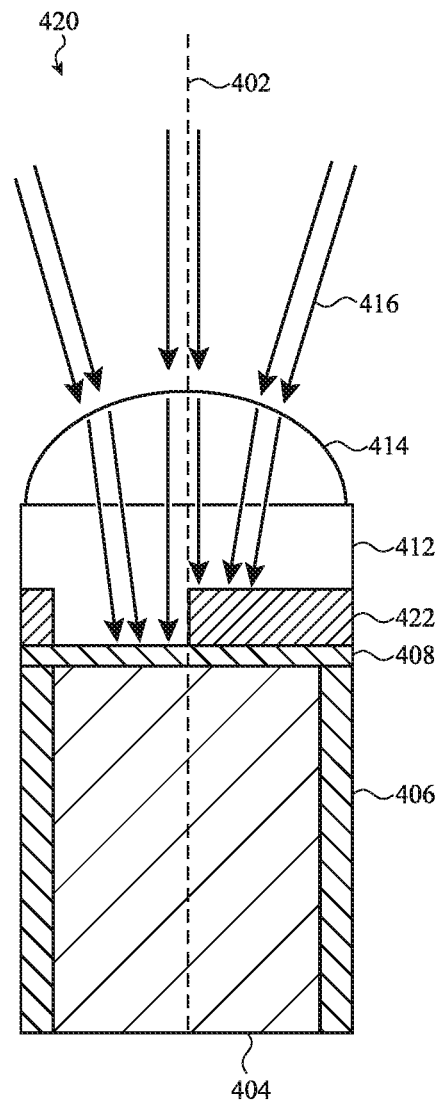

FIG. 4B shows an example longitudinal cross-section of yet another pixel 420. The pixel 420 is similar to the pixel 400 described with reference to FIG. 4A, but for having an asymmetric shield 422 disposed over the entire right half of the photodetector 404, but only around a perimeter of the left half of the photodetector 404. The shield 422 tends to block electromagnetic radiation 416 (e.g., light) arriving at the pixel 400 from particular directions (e.g., directions right of the pixel's longitudinal axis 402), or at particular incident angles (e.g., right of pixel incident angles), from impinging on the photodetector 404. The pixel 420 may be operated (activated/deactivated/read) similarly to the pixel 300 described with reference to FIG. 3. The pixel 420 may at times be referred to as a metal shield pixel, an asymmetric metal pixel, or a right-shielded asymmetric pixel (e.g., due to the pixel having more shield coverage on the left of the longitudinal axis 402 than on the right of the longitudinal axis 402.

Figure 5:
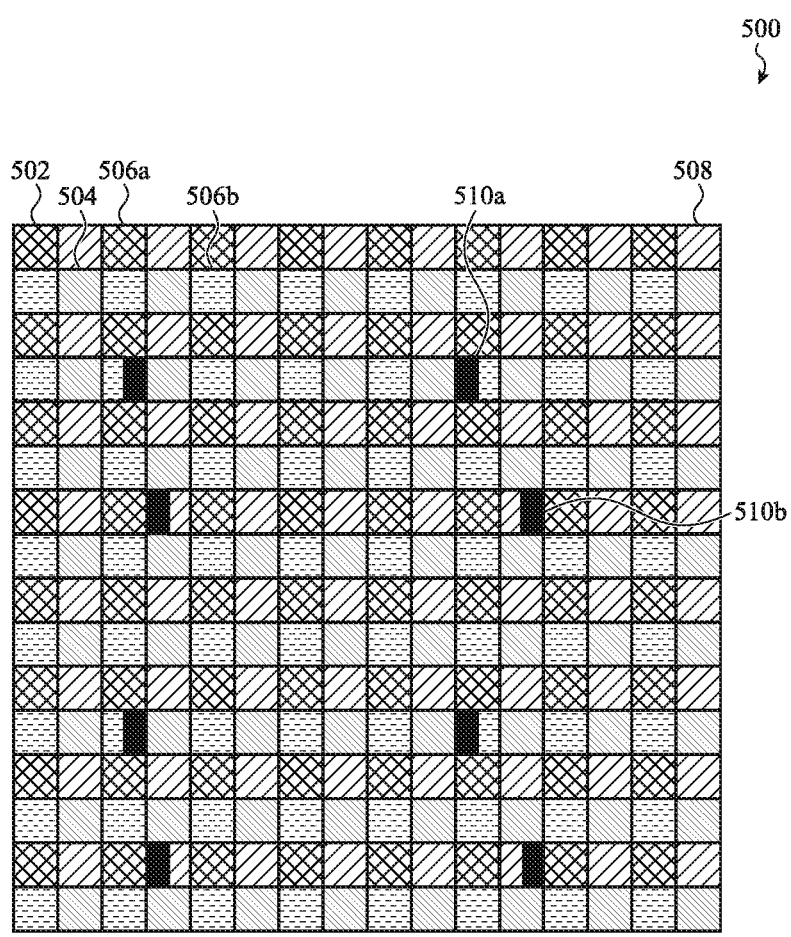
FIG. 5 shows an example distribution of symmetric and asymmetric pixels in a pixel array.

FIG. 5 shows an example distribution of symmetric and asymmetric pixels in a pixel array 500, which is an example of the pixel array 206 described with reference to FIG. 2. The pixels may include red symmetric pixels 502, blue symmetric pixels 504, and green symmetric pixels 506a, 506b arranged in accordance with a Bayer pattern (or alternatively, another pattern, or no pattern). Each of the symmetric pixels 508 may be configured as described with reference to FIG. 3 or in other ways. Asymmetric pixels 510 may be interspersed with the symmetric pixels 508. By way of example, and in part because the depicted embodiment of the pixel array 500 includes more green pixels than red or blue pixels, each of the asymmetric pixels 510 may be associated with a green color filter, although asymmetric pixels 510 may alternatively be associated with other filter colors or panchromatic filters (and in some instances, different asymmetric pixels may be associated with different filter colors or panchromatic filters). Some of the asymmetric pixels 510 may be left-shielded asymmetric pixels 510a, and may be configured as described with reference to FIG. 4A or in other ways. Other asymmetric pixels 510 may be right-shielded asymmetric pixels 510b, and may be configured as described with reference to FIG. 4B or in other ways.

Asymmetric pixels 510 having different directional asymmetries may be surrounded by symmetric neighbor pixels 508, as shown. Alternatively, asymmetric pixels 510 having different directional asymmetries may be positioned adjacent one another within the pixel array 500 (with a pair of asymmetric pixels 510a, 510b having different directional asymmetries surrounded by symmetric neighbor pixels 508). By way of example, the pixel array 500 includes two asymmetric pixel 510, having different directional asymmetries, per every block of eight rows and eight columns. Asymmetric pixels 510 may also be interspersed with symmetric pixels 508 in other ways, or at varying densities. In alternative embodiments, all of the asymmetric pixels 510 may have the same directional asymmetry.

Figure 6:
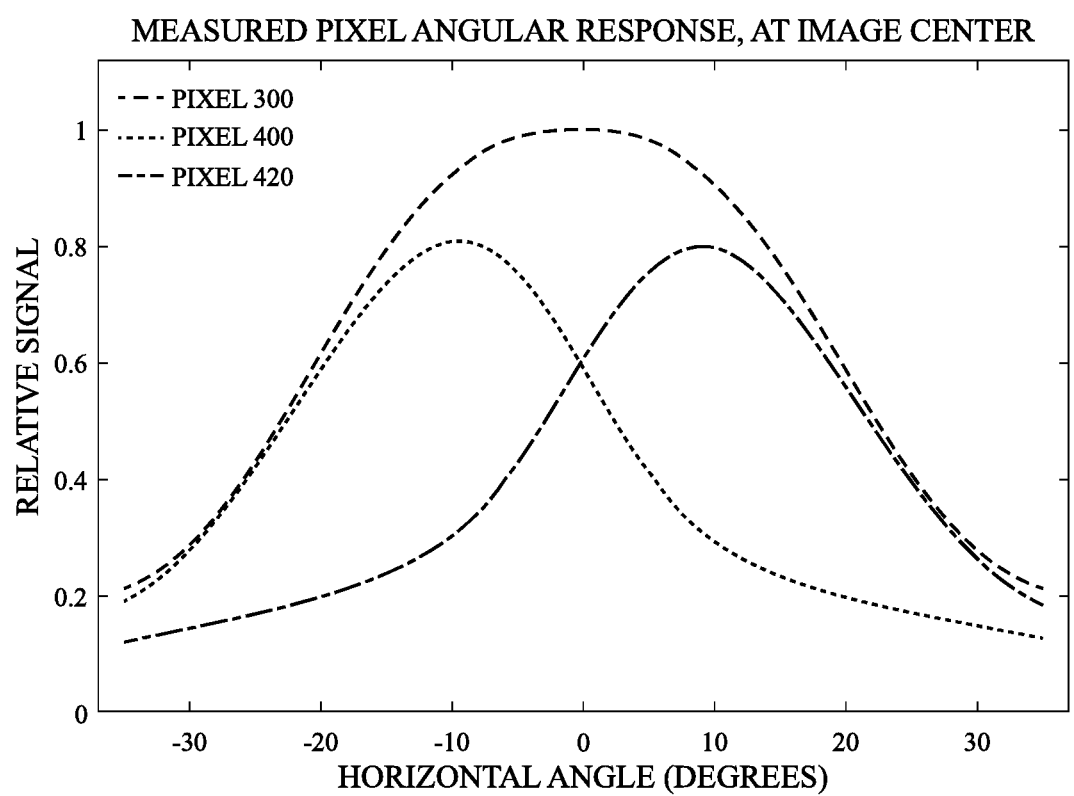
FIG. 6 shows angular responses of the pixels described with reference to FIGS. 3, 4A, & 4B.

FIG. 6 shows angular responses of the pixels described with reference to FIGS. 3, 4A, & 4B. More particularly, and given a point light source (or other electromagnetic radiation source) positioned at various angles with respect to each of the pixels, FIG. 6 shows relationships between an angular position of the point light source (Horizontal Angle (degrees)) and the strength of a signal produced by each of the pixels (Relative Signal). One can appreciate, from FIG. 6, that left-shielded asymmetric pixels (described with reference to FIG. 4A) respond to light received from the right (i.e., from positive angles), whereas right-shielded asymmetric pixels (described with reference to FIG. 4B) respond to light received from the left (i.e., from negative angles). Symmetric pixels respond to light received from a range of incident angles that is generally centered with respect to a longitudinal axis of the pixel.

Given their different angular responses, as shown in FIG. 6, asymmetric pixels provide phase information for incoming electromagnetic radiation. The phase information may be used for focusing a camera (e.g., for auto-focus). The phase information can also be used for image flare detection, and as described herein, can be used to detect a directionality (or directionalities) of image flare, and in some cases can be used to determine the direction(s) to one or more causes of image flare. The pixel values received from asymmetric pixels may be used for image generation, but may be adjusted given the weaker signal strength of asymmetric pixels with respect to symmetric pixels, as shown in FIG. 6.

When left-shielded asymmetric pixels and right-shielded pixels are interspersed in a pixel array, differences in their signals can be used to identify an out-of-phase or out-of-focus condition. That is, when an image is in-focus, the signals or pixel values obtained from left-shielded asymmetric pixels and right-shielded asymmetric pixels should be substantially the same (both in magnitude and polarity). When they differ, the camera including the asymmetric pixels is out-of-focus, and a camera lens position may be adjusted.

As previously discussed, the directional asymmetries of asymmetric pixels, such as left and right-shielded asymmetric pixels, may also be used to determine when an image is affected by image flare. In addition to detecting the presence of image flare, different directional asymmetries of different asymmetric pixels may be used to detect a directionality (or directionalities) of image flare, and in some cases determine the direction(s) to one or more causes of image flare. This is because image flare often has a directional component. The directionality of image flare is due to the position of its cause (e.g., the sun, a lamp, or a reflective surface) within or outside an imaged scene. This directionality can be determined when a pixel array includes asymmetric pixels having different directional asymmetries, because asymmetric pixels having different directional asymmetries are affected differently by image flare. Different asymmetric pixels having the same directional asymmetry may also be affected differently. FIGS. 7, 8A, 8B, 9A, & 9B describe various devices and methods for detecting a directionality (or directionalities) of image flare, and in some cases determining the direction(s) to one or more causes of image flare, as well as devices and methods for distinguishing image flare from noise based on the directionality of image flare.

Figure 7:
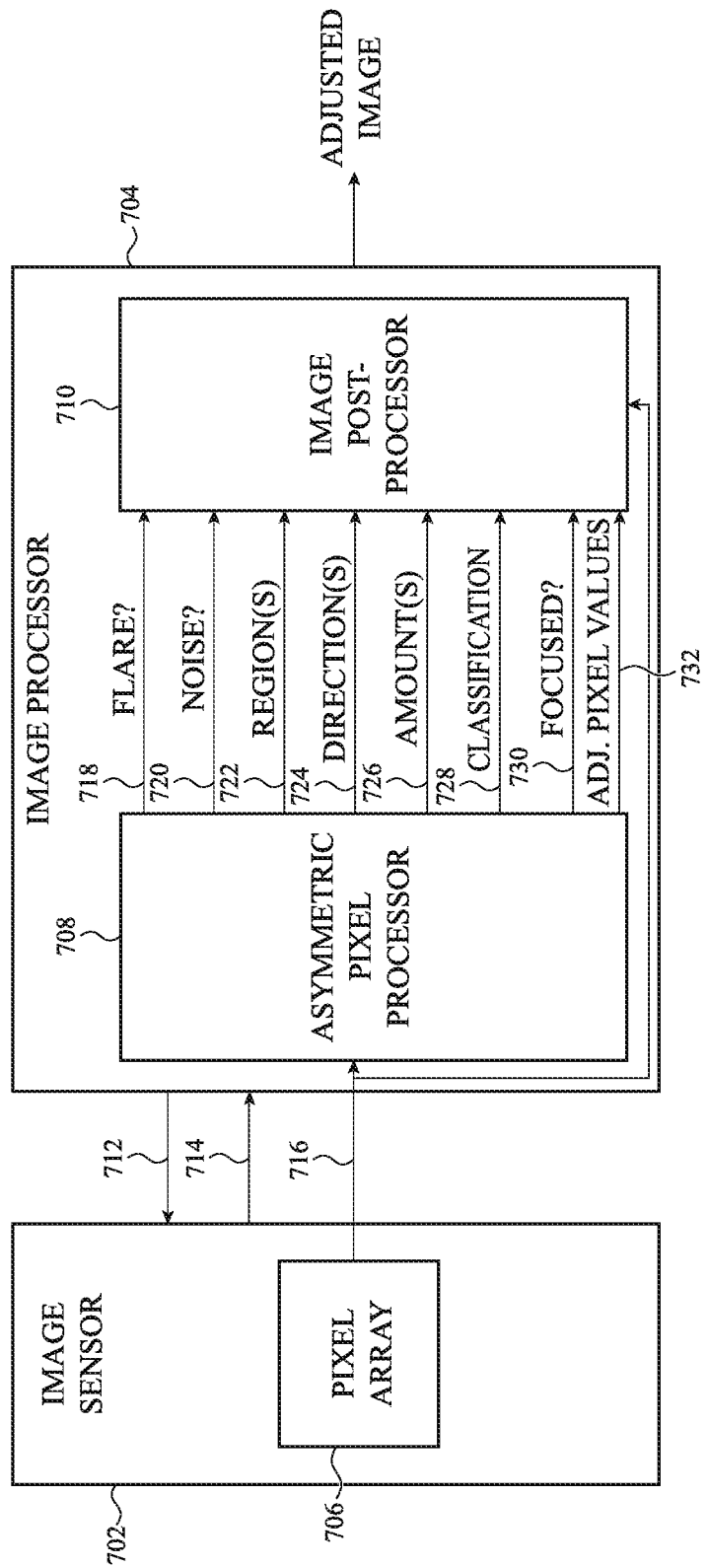
FIG. 7 shows an example block diagram of an imaging system.

FIG. 7 shows an example block diagram of an imaging system 700. In some examples, the imaging system 700 may be included in a device such as the device described with reference to FIGS. 1A & 1B.

In some embodiments, the components of the imaging system 700 may be included in a camera (e.g., the components may be solely or primarily used to provide a camera function for a device). In other embodiments, some of the components of the imaging system 700 may be used to support a camera function and other functions of a device. For example, a pixel array 706 of the imaging system 700 may be part of a camera, and part or all of an image processor 704 may be provided by a multipurpose processing system.

As shown, the imaging system 700 may include an image sensor 702 and an image processor 704. Although an example distribution of components between the image sensor 702 and image processor 704 is shown, the components shown in FIG. 6 may be otherwise distributed between the image sensor 704, the image processor 704, or other components. In some embodiments, the image sensor 702 may be an example of the image sensor 202 described with reference to FIG. 2. The image sensor 700 may include a pixel array 706.

The pixel array 706 may include asymmetric pixels having different directional asymmetries. For example, the pixel array 706 may include a first set of asymmetric pixels distributed across the pixel array 706 and having a first directional asymmetry, and a second set of asymmetric pixels distributed across the pixel array 706 and having a second directional asymmetry different from the first directional asymmetry. In some embodiments, the second directional asymmetry may be out-of-phase with the first directional asymmetry (e.g., as described with reference to FIGS. 11-14). In some embodiments, the second directional asymmetry may be orthogonal to the first directional asymmetry. In some embodiments, the pixel array 706 may include additional sets of asymmetric pixels, with some sets of asymmetric pixels having directional asymmetries that are out-of-phase and some sets of pixels having directional asymmetries that are orthogonal (e.g., as described with reference to FIGS. 13 & 14).

In some examples, the pixel array 706 may include symmetric pixels in addition to asymmetric pixels. However, as described with reference to FIG. 14, the pixel array 706 may in some cases only include asymmetric pixels. When the pixel array 706 includes both symmetric and asymmetric pixels, the asymmetric pixels may be interspersed with the symmetric pixels and distributed across the pixel array 706 (e.g., as described with reference to FIGS. 5 & 12).

In some embodiments, the image processor 704 may include an asymmetric pixel processor 708 and an image post-processor 710. In some embodiments, these processors may be incorporated into a single processor, or part or all of the image processor 704 may be incorporated into a multi-purpose processor. In some embodiments, one or more of the processors 704, 708, 710 may be subdivided into multiple components.

The image processor 704 may provide one or more signals 712 to the image sensor 702 to control the image sensor 702. For example, the image processor 704 may provide signals 712 to the image sensor 702 to turn the image sensor 702 on or off, or to determine when or how long the pixels of the image sensor 702 integrate charge during an image capture frame. In some embodiments, the image processor 704 may receive feedback signals 714 from the image sensor 702.

During an image capture frame of the image sensor 702, a set of pixel values 716 may be obtained for the pixel array 706. Each pixel value may represent the amount of charge integrated by a pixel during the image capture frame. The pixel values 716 may be transferred from the image sensor 702 to the image processor 704 as a set of digital values. Alternatively, the pixel values 716 may be analog values that are converted to digital values by the image processor 704. The pixel values 716 captured during an image capture frame may include pixel values for all of the pixels in the pixel array 706, or pixel values for only some of the pixels in the pixel array 706.

The asymmetric pixel processor 708 may receive, from the image sensor 702 or a memory that stores pixel values obtained by the image sensor 702, the pixel values captured for asymmetric pixels. Alternatively, the asymmetric pixel processor 708 may receive pixel values captured for just some of the asymmetric pixels, or pixel values captured for both symmetric and asymmetric pixels. The asymmetric pixel processor 708 may evaluate the pixel values for at least the asymmetric pixels to determine whether the pixel values of an image captured during an image capture frame are affected by image flare. In some cases, the asymmetric pixel processor 708 may also determine whether a set of pixel values tends to indicate the presence of image flare or noise. If an image is affected by image flare, the asymmetric pixel processor 708 may identify a region (or regions) of the pixel array 706 (or image) affected by image flare, a directionality (or directionalities) of image flare, the direction(s) to one or more causes of image flare, or an amount of image flare. The asymmetric pixel processor 708 may also classify an image in response to pixel values obtained for asymmetric or other pixels. In some cases, the asymmetric pixel processor 708 may identify more than one region of the pixel array 706 affected by image flare, and in some cases, separate characteristics of the image flare affecting each region. The asymmetric pixel processor 708 may also evaluate the pixel values for at least the asymmetric pixels to determine a focus of an image captured by the pixel array 706, or may use the asymmetric pixel values for other purposes. In some embodiments, the asymmetric pixel processor 708 may evaluate the asymmetric pixel values by comparing the asymmetric pixel values to other asymmetric pixel values, or by comparing the asymmetric pixel values to symmetric pixel values.

The asymmetric pixel processor 708 may provide, to the image post-processor, image flare determinations (Flare? 718), noise determinations (Noise? 720), indications of regions affected by image flare (Region(s) 722), indications of directionalities of image flare or directions to causes of image flare (Direction(s) 724), indications of amounts of flare (Amount(s) 726), an image classification (Classification 728), or image focus information (Focused? 730). The asymmetric pixel processor 708 may also adjust or combine the pixel values of asymmetric pixels and provide adjusted or combined pixel values (Adj. Pixel Values 732) to the image post-processor 710.

The image post-processor 710 may receive, from the image sensor 702 or a memory that stores pixel values obtained by the image sensor 702, symmetric pixel values (if any) or asymmetric pixel values. The image post-processor 710 may also receive adjusted or combined pixel values from the asymmetric pixel processor 708. In some embodiments, all of the pixels in the pixel array may be asymmetric pixels, and all of the pixel values received by the image post-processor 710 may be pixel values for asymmetric pixels, or adjusted or combined pixel values received from the asymmetric pixel processor 708. A scenario in which all of the pixel values received by the image post-processor 710 may be pixel values for asymmetric pixels, or adjusted or combined pixel values, is a scenario in which the pixel array 706 is configured as described with reference to FIG. 14.

The image post-processor 710 may use the information provided by the asymmetric pixel processor 708 to process a set of pixel values (e.g., pixel values representing an image) received from the image sensor 702 or the asymmetric pixel processor 708. The processing may variously include: adjusting pixel values to remove image flare, adjusting pixel values to enhance image flare (e.g., increasing the size of an area affected by image flare, or extending the effects of flare along a ray of light), or adjusting pixel values to reshape an area affected by image flare. In some cases, the image may be processed in accordance with a detected directionality (or directionalities) of image flare, and/or in accordance with a determined direction(s) to one or more causes of image flare. In some cases, the processing in accordance with the detected directionality (or directionalities) of image flare and/or determined direction(s) to one or more causes of image flare may be limited to or concentrated on an identified region of the image affected by image flare. For purposes of this description, "concentrating" processing on an identified region of an image means that a higher percentage of pixel values are adjusted within the identified region than in a surrounding region, and/or individual pixel values are adjusted more (e.g., increased or decreased more) within the identified region than in a surrounding region, and/or an average pixel value is adjusted more (e.g., increased or decreased more) within the identified region than in a surrounding region.

Figure 8A:
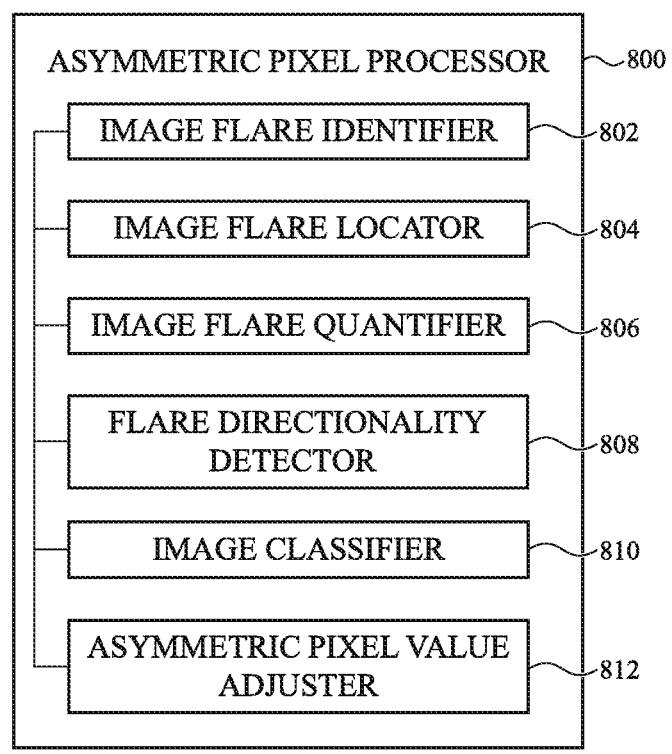
FIGS. 8A & 8B show examples of asymmetric pixel processors.

FIG. 8A shows an example of an asymmetric pixel processor 800. The asymmetric pixel processor 800 may be an example of the asymmetric pixel processor 708 described with reference to FIG. 7. The asymmetric pixel processor 800 may include an image flare identifier 802, an image flare locator 804, an image flare quantifier 806, an flare directionality detector 808, an image classifier 810, or an asymmetric pixel value adjuster 812.

The image flare identifier 802 may be used to determine whether pixel values in a pixel array indicate the presence of image flare in an image. In some embodiments, the image flare identifier 802 may determine whether a pixel value obtained from an asymmetric pixel satisfies an image flare threshold. The image flare threshold may be an absolute threshold or a relative threshold. When the image flare threshold is a relative threshold, the image flare threshold may be: a threshold based on one or more pixel values obtained for one or more symmetric pixels; a threshold based on one or more pixel values obtained for one or more asymmetric pixels; a threshold determined as an amount or percentage increase over a dark current or other baseline value for the asymmetric pixel; or a threshold determined as an amount or percentage increase over a dark current average or other average baseline value for a set of symmetric or asymmetric pixels.

An image flare threshold based on one or more pixel values obtained for one or more symmetric pixels may be, in some examples, a threshold determined as an amount or percentage increase over an average pixel value of one or more symmetric pixels that are neighbor pixels to the asymmetric pixel for which the image flare threshold is determined. Alternatively, an image flare threshold based on one or more pixel values obtained for one or more symmetric pixels may be a threshold determined as an amount or percentage increase over an average of all pixel values for symmetric pixels.

An image flare threshold based on one or more pixel values obtained for one or more asymmetric pixels may be, in some examples, a threshold determined as an amount or percentage increase over an average pixel value of one or more asymmetric pixels that are neighbor pixels to the asymmetric pixel for which the image flare threshold is determined. The neighbor pixels may in some cases include only neighbor pixels having a same directional asymmetry as the asymmetric pixel for which the image flare threshold is determined. Alternatively, an image flare threshold based on one or more pixel values obtained for one or more asymmetric pixels may be a threshold determined as an amount or percentage increase over an average of all pixel values for all asymmetric pixels (or an average of all pixel values for asymmetric pixels having a same directional asymmetry as the asymmetric pixel for which the image flare threshold is determined).

A pixel value for each asymmetric pixel may be compared to a single image flare threshold, or different pixel values may be compared to different image flare thresholds. Image flare may be identified when a single pixel value satisfies an image flare threshold, or when a predetermined number or percentage of pixel values satisfies an image flare threshold (which image flare threshold may be the same threshold for each pixel value, or include different thresholds for different pixel values). Image flare may also or alternatively be identified using other metrics.

The image flare locator 804 may be used to evaluate pixel values, for at least asymmetric pixels, to identify a region of a pixel array affected by image flare. In some cases, the image flare locator may include the image flare identifier 802. In some embodiments, the image flare locator 804 may identify a plurality of regions (e.g., predetermined regions) of a pixel array (or image), evaluate groups of pixel values obtained from asymmetric pixel values within each region, and identify a region as affected by image flare when one or a predetermined number or percentage of the pixel values in the region satisfy an image flare threshold.

In some embodiments, the image flare locator 804 may dynamically identify a region of a pixel array (or image) as a region affected by image flare. A region may be dynamically identified, for example, by moving a fixed size window across a pixel array and identifying a region defined by the moving window as a region affected by image flare when one or a predetermined number or percentage of the pixel values within the region satisfy an image flare threshold. Alternatively, a size of a region affected by image flare may be dynamically determined by generating a boundary, for the region, such that the region includes a predetermined number or percentage of pixel values satisfying an image flare threshold. The image flare locator may perform its operations for each of a plurality of overlapping or non-overlapping regions of a pixel array.

The image flare quantifier 806 may be used to quantify image flare. In some embodiments, image flare may be quantified by quantifying an amount or severity of image flare. Image flare may be quantified per asymmetric pixel, per region, or for an image. Severity may be used to rank the presence of image flare in a less granular way than by amount. For example, severity may be good or bad, or a rank on a scale of 1-10 or 1-100. In some cases, image flare may be quantified with respect to a baseline or average pixel value.

The flare directionality detector 808 may be used to detect a directionality (or directionalities) of image flare, and in some cases to determine a direction (or directions) to one or more causes of image flare. For example, when pixel values of asymmetric pixels having a particular directional asymmetry satisfy an image flare threshold and indicate the presence of image flare, the directional asymmetry of those pixels may indicate a directionality (or directionalities) of image flare and/or a direction (or directions) to one or more causes of image flare. A right-shielded asymmetric pixel, for example, may block high incident angle light arriving from the right of a scene, and may therefore indicate that a cause of image flare is generally in front of or to the left of the asymmetric pixel. An amount or severity of image flare indicated by a pixel value obtained from a right-shielded asymmetric pixel may indicate, to some degree, whether a cause of image flare is more in front of or to the left of the pixel, and how much the cause of image flare is to the left of the pixel. In some embodiments, a directionality of image flare or direction to a cause of image flare may be determined as an angle with respect to an image plane, or an angle with respect to an outer surface of a photodetector or other pixel element.

In some embodiments, the flare directionality detector 808 may use the pixel values and directional asymmetries of asymmetric pixels, and in some cases the pixel values of symmetric pixels, to determine the directionality (or directionalities) of image flare and/or direction(s) to cause(s) of image flare. For example, when a plurality of asymmetric pixels having a particular directional asymmetry indicate the presence of image flare, but their associated pixel values vary, the variance in pixel values may be used to determine a directionality (or directionalities) of image flare and/or direction(s) to cause(s) of image flare. In some embodiments, a variance in pixel values of asymmetric pixels having a first asymmetric direction (e.g., right-shielded asymmetric pixels) and a variance in pixel values of asymmetric pixels having a second asymmetric direction (e.g., top-shielded asymmetric pixels) may be used to determine a directionality (or directionalities) and/or direction(s) to cause(s) of image flare. In some embodiments, variances in pixel values of four types of asymmetric pixels (e.g., right-shielded, left-shielded, top-shielded, and bottom-shielded) may be used to determine a direction to a cause of image flare.

The flare directionality detector 808 may, in some cases, pattern match 1) a distribution of pixel values and directional asymmetries of asymmetric pixels (and in some cases, pixel values of symmetric pixels) to 2) a set of patterns representing exposures of a pixel array to causes of image flare positioned at different directions with respect to the pixel array. The flare directionality detector 808 may identify a directionality (or directionalities) of image flare and/or the direction(s) to cause(s) of image flare by identifying a pattern that best matches the distribution of pixel values and directional asymmetries.

In some embodiments, the flare directionality detector 808 may also or alternatively determine whether a cause of image flare is within or outside a scene imaged by a pixel array during an image capture frame. This determination may be made using the pixel values and directional asymmetries of asymmetric pixels, and in some cases may be made by additionally using the pixel values of symmetric pixels. In some embodiments, a determination of whether a cause of image flare is within or outside an imaged scene may be made as a byproduct of the pattern matching described in the preceding paragraph. For example, some of the patterns to which a distribution of pixel values and directional asymmetries is matched may be patterns in which a cause of image flare is within the imaged scene, and other patterns may be patterns in which a cause of image flare is outside the imaged scene.

The image classifier 810 may be used to classify an image captured during an image capture frame. The image classifier 810 may classify an image based on a detected directionality (or directionalities) or determined direction(s) to cause(s) of image flare, region(s) of a pixel array that are affected by image flare, or quantified amount(s) of image flare per asymmetric pixel. In some embodiments, an image may be classified by pattern matching one or more of the preceding items to a set of patterns representing the effects of different types of image flare (e.g., image flare caused by direct exposure to sunlight, image flare from sunlight filtered through a set of tree leaves, image flare caused by a flash, image flare caused by one or more types of artificial light, and so on). Image classifications may include, for example, classifications based on the type of image flare to which an image has been exposed, or classifications based on the severity of image flare to which an image has been exposed.

The asymmetric pixel value adjuster 812 may be used to adjust or combine asymmetric pixel values. For example, asymmetric pixels may generally have lower gains, because asymmetric pixels only receive light from unblocked directions (see, e.g., FIG. 5). The asymmetric pixel value adjuster 812 may thus increase the pixel values of asymmetric pixels. However, given that asymmetric pixels may be more sensitive to image flare, the asymmetric pixel value adjuster 812 may also decrease the pixel values of asymmetric pixels affected by image flare. Furthermore, and as will be described in more detail with reference to FIGS. 13 & 14, some pixels may be formed as a set of asymmetric pixels (or sub-pixels) having different directional asymmetries (e.g., four asymmetric pixels having different directional asymmetries and receiving light through a same color filter). In these cases, the pixel values for the asymmetric pixels (or sub-pixels) may be combined to form a pixel value of a particular color.

The outputs of the asymmetric pixel processor 800 may be provided to an image post-processor, such as the image post-processor 710 described with reference to FIG. 7. The image post-processor 710 may process an image defined by a set of pixel values in accordance with a detected directionality (or directionalities) and/or determined direction(s) to one or more causes of image flare. The image post-processor 710 may additionally or alternatively process an image in accordance with a determined region of a pixel array affected by image flare, a quantified amount of image flare, or an image classification. For example, the image post-processor 710 may concentrate 1) image processing techniques performed in accordance with a detected directionality (or directionalities) and/or determined direction(s) to one or more causes of image flare on 2) an identified region of a pixel array (or image) affected by image flare. As another example, the image post-processor 710 may process an image classified as being affected by image flare caused by in-scene incandescent lighting different from an image classified as being affected by image flare caused by out-of-scene incandescent lighting or an image classified as being affected by image flare caused by the sun.

In some cases, the image post-processor 710 may directionally mitigate or directionally accentuate an effect of image flare. For example, the image post-processor 710 may apply image processing techniques that are directionally tuned to process image flare.

In some embodiments, the image post-processor 710 may determine to keep or alternatively discard an image in response to a classification of the image. For example, an image that is too severely affected by flare may be discarded.

In some embodiments, the image post-processor 710 may determine which of a set of images to keep or discard, or whether to combine an image affected by image flare with other images that are not affected by image flare (or not as severely affected). For example, the asymmetric pixel processor 800 may obtain pixel values, evaluate the pixel values, and classify an image (and in some cases determine a directionality (or directionalities) of image flare and/or the direction(s) to cause(s) of image flare, a region (or regions) of a pixel array affected by image flare, or a quantity of image flare) for each image in a set of images captured during a set of image capture frames. The image post-processor 710 may rank the images using their classifications, and select from the ranked images one or more images to keep, one or more images to discard, or one or more images to flag. For example, in a set of images associated with a "live photo" (i.e., a short video clip that plays before ending on a still image selected from the frames of the video clip, thereby associating the still frame with subtle movement or a "live" feeling), a frame or image that is less affected (or not affected) by image flare may be flagged as a thumbnail image for representing a saved file including the images. As another example, when a high-speed video shot through the rustling leaves of a tree is down-sampled, video frames that are more affected by image flare caused by the sun peeking through the leaves may be dropped. As another example, a final image may be formed from the fusion of a plurality of individual frames, and differences in image flare between frames may be used to adjust the selection of frames for fusion and/or the fusion weight of a given image.

Figure 8B:
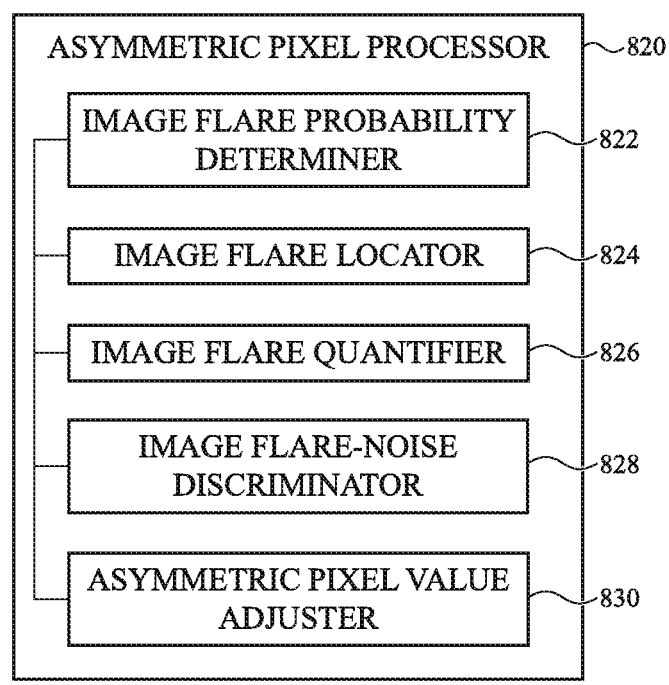

FIG. 8B shows another example of an asymmetric pixel processor 820. The asymmetric pixel processor 820 may be an example of the asymmetric pixel processor 708 described with reference to FIG. 7 or 8A. The asymmetric pixel processor 820 may include an image flare probability determiner 822, an image flare locator 824, an image flare quantifier 826, an image flare-noise discriminator 828, or an asymmetric pixel value adjuster 830.

The asymmetric pixel processor 820 assumes the availability of pixel values obtained from asymmetric pixels having a first directional asymmetry, and pixel values obtained from asymmetric pixels having a second directional asymmetry. The second directional asymmetry is different from the first directional asymmetry, and in some cases is out-of-phase with or orthogonal to the first directional asymmetry. In some embodiments, the components of the asymmetric pixel processor 820 may separately operate on pixel values of the asymmetric pixels disposed in each region of a pixel array.

The image flare probability determiner 822 may be used to determine whether pixel values obtained from asymmetric pixels indicate the presence of image flare in an image. In some embodiments, the image flare probability determiner 822 may determine whether a pixel value obtained from an asymmetric pixel satisfies an image flare threshold. The image flare threshold may be an absolute threshold or a relative threshold. When the image flare threshold is a relative threshold, the image flare threshold may be: a threshold based on one or more pixel values obtained for one or more symmetric pixels; a threshold based on one or more pixel values obtained for one or more asymmetric pixels; a threshold determined as an amount or percentage increase over a dark current or other baseline value for the asymmetric pixel; or a threshold determined as an amount or percentage increase over a dark current average or other average baseline value for a set of symmetric or asymmetric pixels.

An image flare threshold based on one or more pixel values obtained for one or more symmetric pixels may be, in some examples, a threshold determined as an amount or percentage increase over an average pixel value of one or more symmetric pixels that are neighbor pixels to the asymmetric pixel for which the image flare threshold is determined. Alternatively, an image flare threshold based on one or more pixel values obtained for one or more symmetric pixels may be a threshold determined as an amount or percentage increase over an average of all pixel values for symmetric pixels.

An image flare threshold based on one or more pixel values obtained for one or more asymmetric pixels may be, in some examples, a threshold determined as an amount or percentage increase over an average pixel value of one or more asymmetric pixels that are neighbor pixels to the asymmetric pixel for which the image flare threshold is determined. The neighbor pixels may in some cases include only neighbor pixels having a same directional asymmetry as the asymmetric pixel for which the image flare threshold is determined. Alternatively, an image flare threshold based on one or more pixel values obtained for one or more asymmetric pixels may be a threshold determined as an amount or percentage increase over an average of all pixel values for all asymmetric pixels (or an average of all pixel values for asymmetric pixels having a same directional asymmetry as the asymmetric pixel for which the image flare threshold is determined).

A pixel value for each asymmetric pixel may be compared to a single image flare threshold, or different pixel values may be compared to different image flare thresholds. The image flare probability determiner 822 may determine that pixel values obtained from the asymmetric pixels having the first directional asymmetry indicate the presence of image flare when a single pixel value satisfies an image flare threshold, or when a predetermined number or percentage of pixel values satisfies an image flare threshold (which image flare threshold may be the same threshold for each pixel value, or include different thresholds for different pixel values). Image flare may also or alternatively be identified using other metrics.

The image flare locator 824 may be used to evaluate pixel values, for at least asymmetric pixels, to identify a region of a pixel array affected by image flare. In some cases, the image flare locator may include the image flare probability determiner 822. In some embodiments, the image flare locator 824 may identify a plurality of regions (e.g., predetermined regions) of a pixel array (or image), evaluate groups of pixel values obtained from asymmetric pixel values within each region, and identify a region as probably affected by image flare when one or a predetermined number or percentage of the pixel values in the region satisfy an image flare threshold.

In some embodiments, the image flare locator 824 may dynamically identify a region of a pixel array (or image) as a region affected by image flare. A region may be dynamically identified, for example, by moving a fixed size window across a pixel array and identifying a region defined by the moving window as a region affected by image flare when one or a predetermined number or percentage of the pixel values within the region satisfy an image flare threshold. Alternatively, a size of a region affected by image flare may be dynamically determined by generating a boundary, for the region, such that the region includes a predetermined number or percentage of pixel values satisfying an image flare threshold. The image flare locator 824 may perform its operations for each of a plurality of overlapping or non-overlapping regions of a pixel array.

The image flare quantifier 826 may be used to quantify image flare. In some embodiments, image flare may be quantified by quantifying an amount or severity of image flare. Image flare may be quantified per asymmetric pixel, per region, or for an image. Severity may be used to rank the presence of image flare in a less granular way than by amount. For example, severity may be good or bad, or a rank on a scale of 1-10 or 1-100. In some cases, image flare may be quantified with respect to a baseline or average pixel value.

The image flare-noise discriminator 828 may be used to distinguish image flare from noise. For example, when pixel values obtained from asymmetric pixels having different directional asymmetries tend to indicate the presence of image flare (i.e., when it appears that image flare is associated with multiple directionalities), it is possible that the asymmetric pixels are affected by noise rather than image flare, given that image flare tends to be directional. In some embodiments, the image flare-noise discriminator 828 may distinguish image flare from noise by evaluating a set of pixel values obtained from asymmetric pixels having a directional asymmetry that differs from the directional asymmetry of the pixels that indicate image flare is probable. For example, the image flare probability determiner 822 may determine, for an image capture frame, that a first set of pixel values obtained from a first set of asymmetric pixels having a first directional asymmetry indicates image flare is probable. In response (or in parallel), the image flare-noise discriminator 828 may evaluate a second set of pixel values obtained from a second set of asymmetric pixels having a second directional asymmetry. The second set of pixel values may be evaluated to determine whether the first set of pixel values is really indicative of image flare, or indicative of noise. In some cases, the second set of pixel values may be evaluated by determining whether the pixel values satisfy a same image flare threshold satisfied by the pixel values of the first set of pixel values. When they do, or when a predetermined number or percentage of the pixel values in the second set satisfy the image flare threshold, noise rather than image flare may be affecting a pixel array from which the pixel values are obtained.

In other cases, the second set of pixel values may be evaluated by determining whether the pixel values satisfy a different image flare threshold (or set of thresholds) than an image flare threshold (or set of thresholds) satisfied by the pixel values of the first set of pixel values. The different image flare thresholds may be referred to as image flare confirmation thresholds. When the pixel values in the second set satisfy the image flare confirmation threshold(s), or when a predetermined number or percentage of the pixel values in the second set satisfy the image flare threshold(s), noise rather than image flare may be affecting a pixel array from which the pixel values are obtained. In some cases, the image flare confirmation threshold(s) may be lower than the image flare threshold(s) satisfied by the pixels in the first set.

The second set of pixel values may also or alternatively be evaluated by comparing the pixel values in the second set to pixel values in the first set (or to an average of the pixel values in the first set). When both sets of pixel values are within a predetermined range, an image may be affected by noise rather than image flare.

In some embodiments, the first and second sets of pixel values considered by the image flare-noise discriminator 828 may be pixel values of asymmetric pixels disposed in a particular region (of multiple regions) of a pixel array. In other embodiments, the first and second sets of pixel values considered by the image flare-noise discriminator 828 may be pixel values of asymmetric pixels disposed across the entirety of a pixel array.

The asymmetric pixel value adjuster 830 may be used to adjust or combine asymmetric pixel values. For example, asymmetric pixels may generally have lower gains, because asymmetric pixels only receive light from unblocked directions (see, e.g., FIG. 5). The asymmetric pixel value adjuster 830 may thus increase the pixel values of asymmetric pixels. However, given that asymmetric pixels may be more sensitive to image flare, the asymmetric pixel value adjuster 830 may decrease the pixel values of asymmetric pixels affected by image flare. Furthermore, and as will be described in more detail with reference to FIGS. 13 & 14, some pixels may be formed as a set of asymmetric pixels (or sub-pixels) having different directional asymmetries (e.g., four asymmetric pixels having different directional asymmetries and receiving light through a same color filter). In these cases, the pixel values for the asymmetric pixels (or sub-pixels) may be combined to form an image pixel value of a particular color.

The outputs of the asymmetric pixel processor 820 may be provided to an image post-processor, such as the image post-processor 710 described with reference to FIG. 7. The image post-processor 710 may process an image, defined by a set of pixel values, as described with reference to FIG. 7A. The image post-processor 710 may also process an image one way responsive to determining the image is affected by image flare, and in another way responsive to determining the image is affected by noise.

Figure 9A:
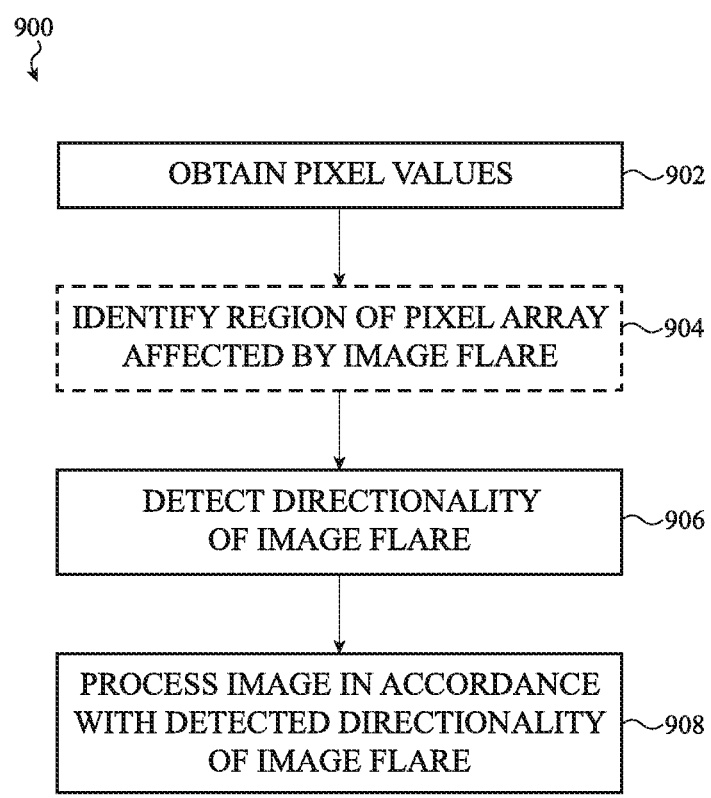
FIG. 9A shows an example method for processing an image affected by image flare.

FIG. 9A shows an example method 900 for processing an image affected by image flare. The method 900 may be performed by the asymmetric pixel processor described with reference to FIG. 8A (or by other asymmetric pixel processors, such as those described with reference to FIGS. 7 & 8B).

The operation(s) at block 902 may include obtaining a set of pixel values captured from a pixel array during an image capture frame. The set of pixel values may include pixel values for a set of asymmetric pixels having different directional asymmetries. The operation(s) at block 902 may be performed, for example, by the image processor or asymmetric pixel processor described with reference to FIG. 7, 8A, or 8B.

The operation(s) at block 904 may optionally include evaluating the pixel values for at least the set of asymmetric pixels to identify a region (or regions) of the pixel array affected by image flare. The operation(s) at block 904 are optional and may be performed, for example, by the image processor or asymmetric pixel processor described with reference to FIG. 7, 8A, or 8B, or by the image flare locator described with reference to FIG. 8A or 8B.

The operation(s) at block 906 may include detecting, using the pixel values for at least the asymmetric pixels and the different directional asymmetries of the asymmetric pixels, a directionality (or directionalities) of image flare. The operation(s) at block 906 may also or alternatively include determining a direction (or directions) to one or more causes of image flare. The operation(s) at block 906 may be performed, for example, by the image processor or asymmetric pixel processor described with reference to FIG. 7, 8A, or 8B, or by the flare cause direction determiner described with reference to FIG. 8A.

The operation(s) at block 908 may include processing an image defined by the set of pixel values in accordance with the detected directionality (or directionalities) of image flare and/or the determined direction(s) to cause(s) of image flare. In some embodiments, the processing of the image in accordance with the detected directionality (or directionalities) of image flare and/or determined direction(s) to cause(s) of image flare may be concentrated on the region(s) identified at block 904. The operation(s) at block 908 may be performed, for example, by the image processor or image post-processor described with reference to FIG. 7, 8A, or 8B.

Figure 9B:
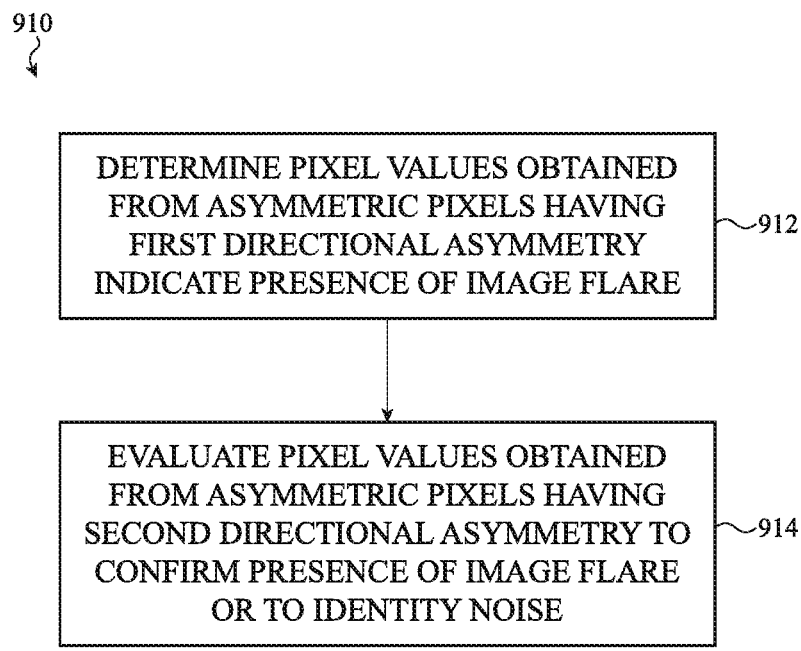
FIG. 9B shows an example method for determining whether an image is affected by image flare or noise.

FIG. 9B shows an example method 910 for determining whether an image is affected by image flare or noise. The method 910 may be performed by the asymmetric pixel processor described with reference to FIG. 8B (or by other asymmetric pixel processors, such as those described with reference to FIGS. 7 & 8A).

The operation(s) at block 912 may include determining that a first set of pixel values obtained from a first set of asymmetric pixels, during an image capture frame, indicates image flare is probable. During the image capture frame, the first set of pixel values and a second set of pixel values may be captured. Additional pixel values may also be captured during the image capture frame. The second set of pixel values may be obtained from a second set of asymmetric pixels. The second set of asymmetric pixels may have a different directional asymmetry than the first set of asymmetric pixels (e.g., an out-of-phase or orthogonal directional asymmetry). The operation(s) at block 912 may be performed, for example, by the image processor or asymmetric pixel processor described with reference to FIG. 7, 8A, or 8B, or by the image flare probability determiner described with reference to FIG. 8B.

The operation(s) at block 914 may include evaluating the second set of pixels values to confirm whether the first set of pixel values is indicative of image flare, or to determine that an image including the pixel values is affected by noise. The operation(s) at block 914 may be performed, for example, by the image processor or asymmetric pixel processor described with reference to FIG. 7, 8A, or 8B, or by the image flare-noise discriminator described with reference to FIG. 8B.

In some embodiments, the method 900 or 910 may include providing a user a cue (e.g., a graphical cue) that indicates how a user should reposition a camera to mitigate or increase the effects of image flare while capturing an image.

Figure 10A:
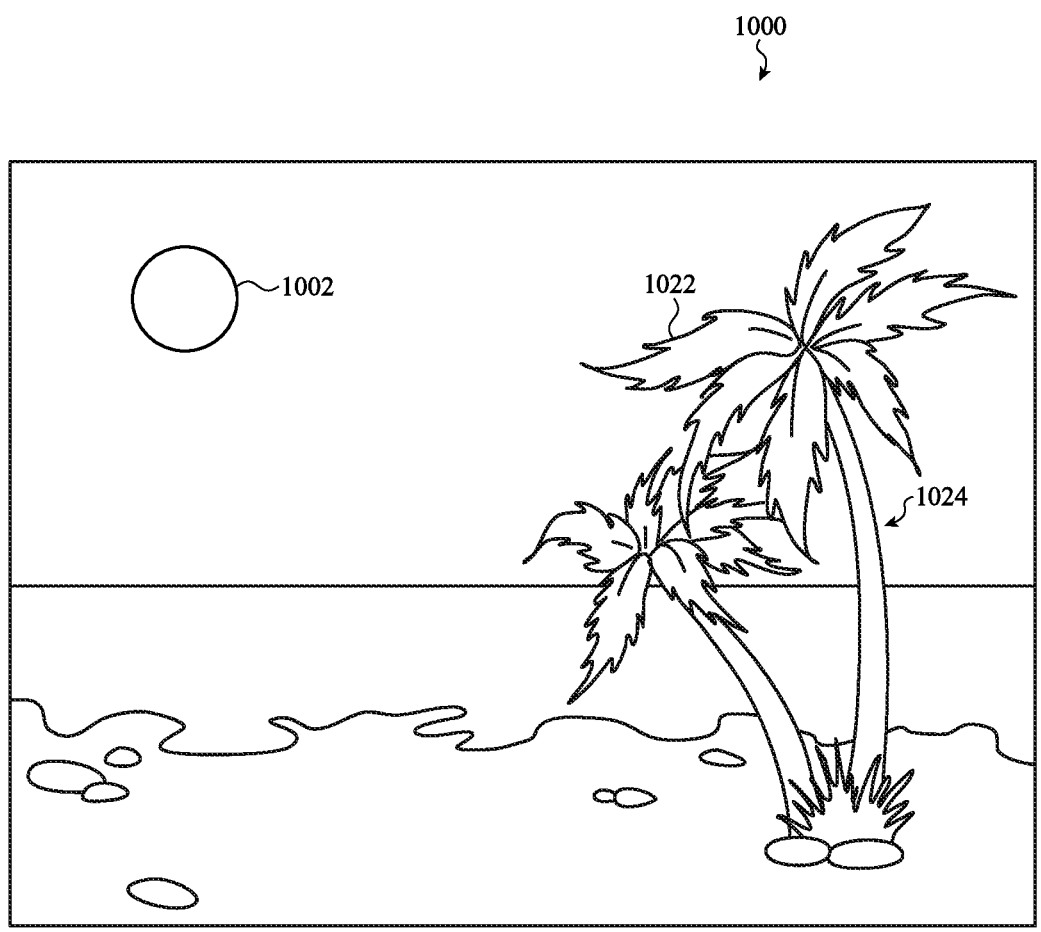
FIGS. 10A-10D shows various scenes that may be imaged by a camera.
Figure 10B:
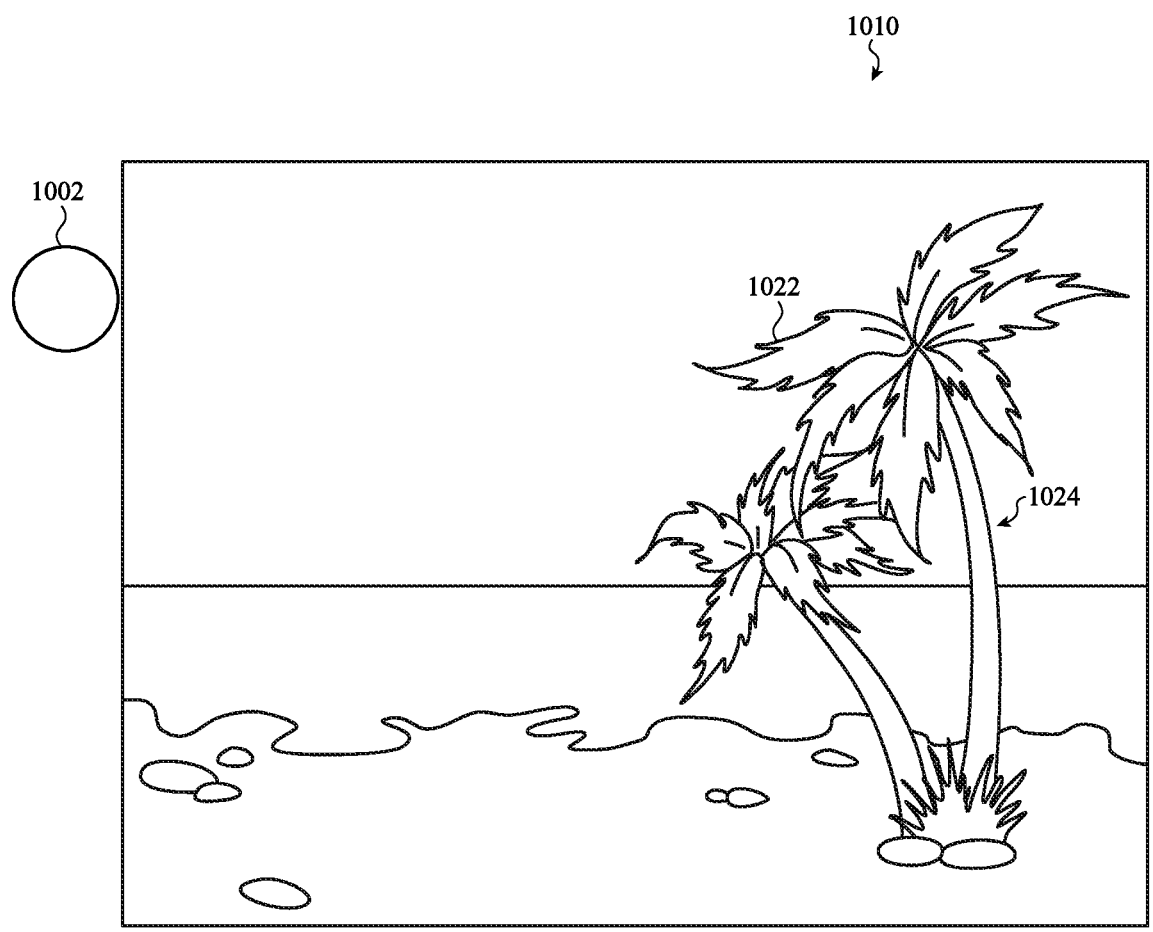
Figure 10C:
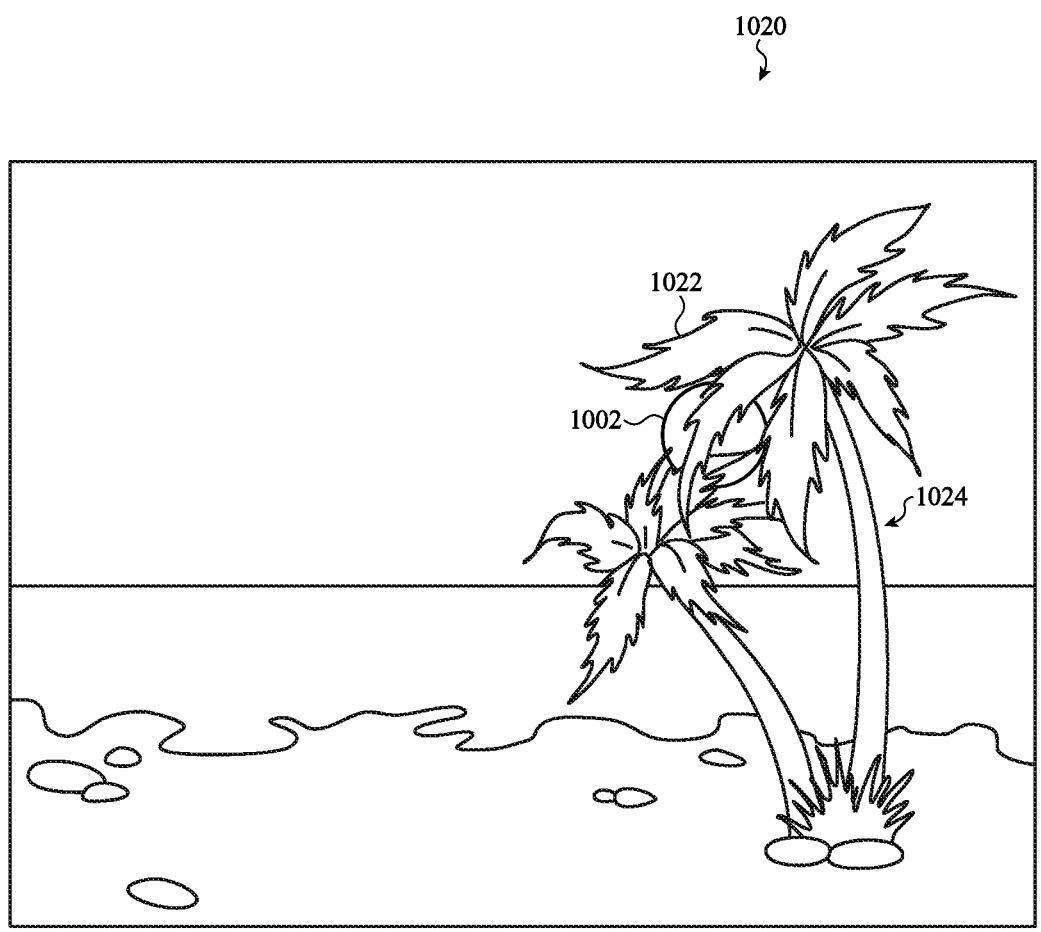

FIGS. 10A-10D shows various scenes that may be imaged by a camera. FIGS. 10A-10C show a sunny beach scene. In FIG. 10A, the sun 1002 is within the scene 1000 imaged by the camera and may be a cause of image flare. In FIG. 10B, the sun 1002 is outside the scene 1010 imaged by the camera, but may still be a cause of image flare. As described primarily with reference to FIG. 7A or 7B, an asymmetric pixel processor or flare cause direction determiner may use pixel values of asymmetric pixels, in combination with the directional asymmetries of the asymmetric pixels or other information, to determine whether the sun 1002 is in the scene 1000 (as shown in FIG. 10A) or outside the scene 1010 (as shown in FIG. 10B).

In FIG. 10C, the sun 1002 is partially obscured by the leaves 1022 of trees 1024. However, depending on the positions of the leaves 1022 (and possibly varying positions of the leaves 1022 as they move with the wind), parts of the sun 1002 may be visible through the leaves 1022. The sun rays that propagate through the leaves 1022 may be a cause of image flare. However, a camera imaging the scene 1020 shown in FIG. 10C may be affected by image flare differently from how the camera is affected by image flare when imaging the scene 1000 or 1010 shown in FIG. 10A or 10B. Classification of the image captured in FIG. 10A, 10B, or 10C may enable an image processor to process images of the scene differently, depending on the determined direction to the cause of image flare, or depending on the classifications of the various images.

Figure 10D:
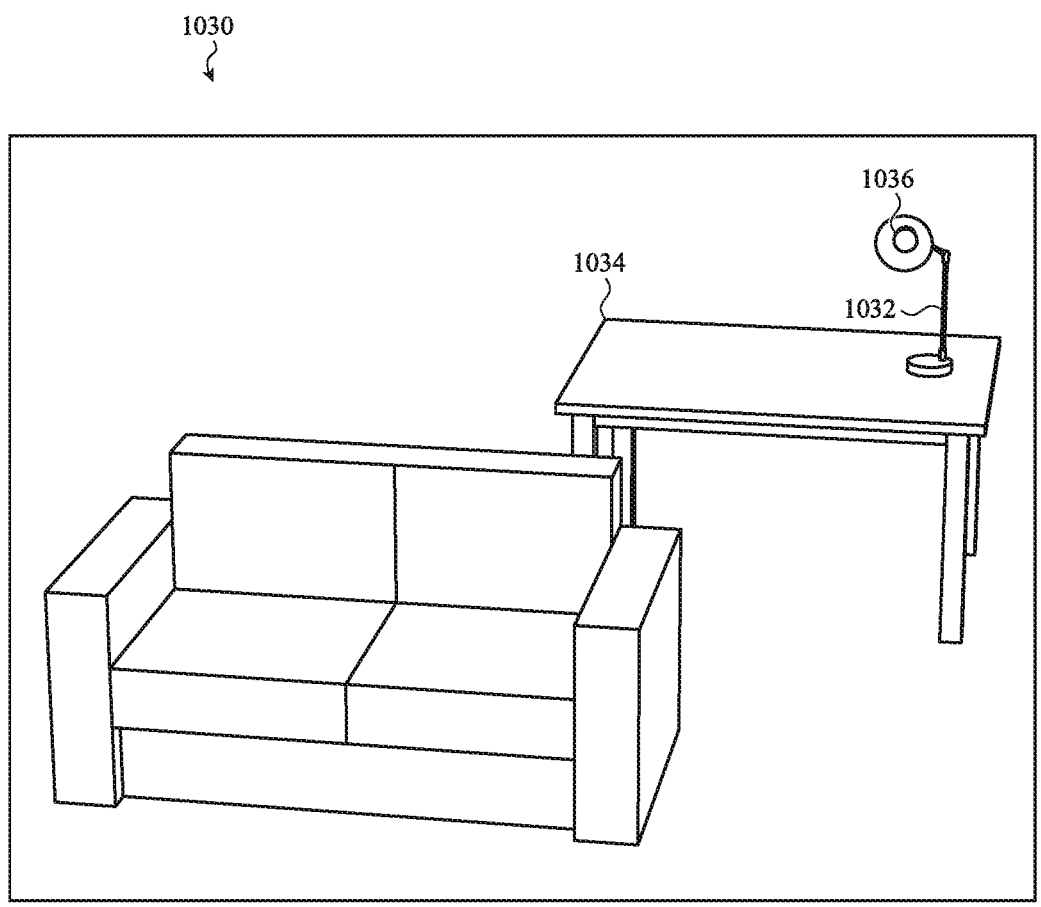

FIG. 10D show a scene 1030 of a room, such as a living room or office. A lamp 1032 sits on a table 1034, and a light source 1036 (e.g., a light bulb) in the lamp 1032 is oriented to project light toward a camera that images the scene 1030. The light source 1036 may be a cause of image flare. However, a camera imaging the scene 1030 shown in FIG. 10D may be affected by image flare differently from how the camera is affected by image flare when imaging the scene 1000, 1010, or 1020 shown in FIG. 10A, 10B, or 10C. Classification of the image captured in FIG. 10D may enable an image processor to process an image of the scene 1030 differently than how the image processor may process images of the scenes 1000, 1010, and 1020 shown in FIGS. 10A-10C.

Figure 11:
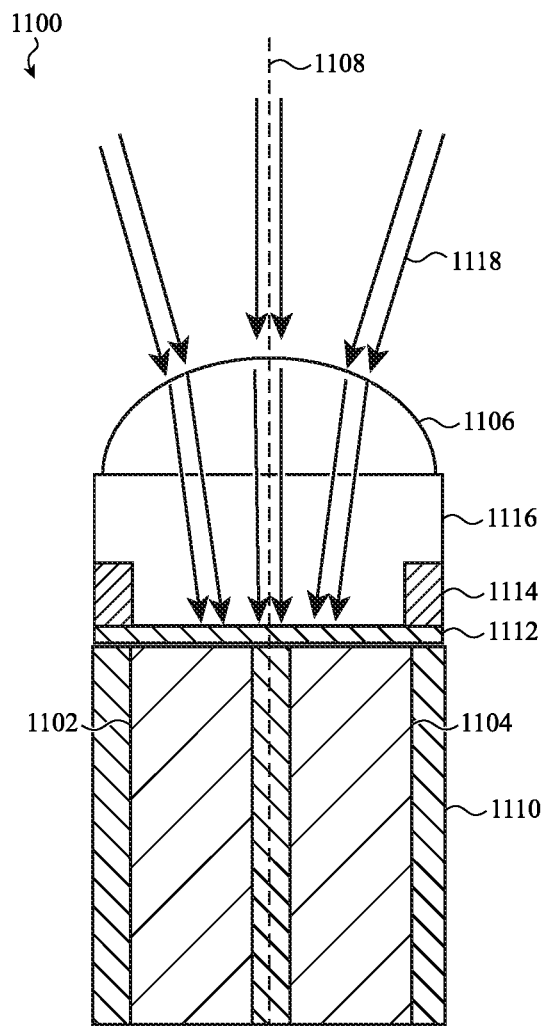
FIG. 11 shows an example longitudinal cross-section of a pixel having two photodetectors positioned under a single microlens.

FIGS. 11-14 show alternative configurations of asymmetric pixels, which asymmetric pixels may be used in the camera, image sensors, and image processing techniques described herein. FIG. 11 shows an example longitudinal cross-section of a pixel 1100 having two photodetectors 1102, 1104 positioned under a single microlens 1106. The two photodetectors 1102, 1104 may at times be referred to as different sub-pixels of the pixel 1100. Similarly to the pixels described with reference to FIGS. 3, 4A, & 4B, a transverse cross-section of the pixel 1100 may be rectangular, oval, circular, square, or otherwise-shaped, and may be uniform or vary along a longitudinal axis 1108 of the pixel 1100. In some examples, one or more of the pixels included in the pixel array 212 described with reference to FIG. 2 may be configured the same as, or similarly to, the pixel 1100.

The pixel 1100 may include first and second photodetectors 1102, 1104 or other photosensitive elements formed on or in a substrate layer. Each photodetector 1102, 1104 may be laterally surrounded by an electromagnetic radiation isolator 1110 (e.g., implant isolation or physical trench isolation).

An optional optical element 1112 (e.g., a coating) may be disposed on outward-facing surfaces of the photodetectors 1102, 1104, and a symmetric shield 1114 (e.g., a metal shield) may be disposed on the optical element 1112 over outward-facing edges of the electromagnetic radiation isolators 1110. The symmetric shield 1114 may be positioned over or around a perimeter of the pair of photodetectors 1102, 1104. The shield 1114 may reduce the probability that electromagnetic radiation received through the microlens 1106 is received by one or more adjacent pixels.

An optional color filter 1116 may be disposed on or over the photodetectors 1102, 1104, or different color filters may be disposed on the different photodetectors 1102, 1104. In some examples, the color filter 1116 may be a red, blue, or green filter forming part of a Bayer pattern color filter, and other pixels within a pixel array may be associated with the same or other color filters. In some examples, the color filter 1116 may form part of another type of color filter for a pixel array (e.g., a CMYK color filter), or the color filter 1116 may form part of a panchromatic or other type of filter for a pixel array. A lens (e.g., a microlens 1106) may be positioned or disposed on a side of the color filter 1116 opposite the photodetectors 1102, 1104.

The pixel 1100 is asymmetric because the curvature of the microlens 1106 bends light 1118 incident on different portions of the microlens 1106, and light incident on the microlens 1106 at different angles, in different directions, such that the two photodetectors 1102, 1104 receive different light based on their different positions under the microlens 1106. Charge integrated by each of the photodetectors 1102, 1104 may be separately read out of the pixel 1100, with one or each of the charges being used as a pixel value of an asymmetric pixel. In some embodiments, the charges may be summed after readout, or alternatively summed during readout, to provide a combined pixel value for the pixel 1100.

Figure 12:
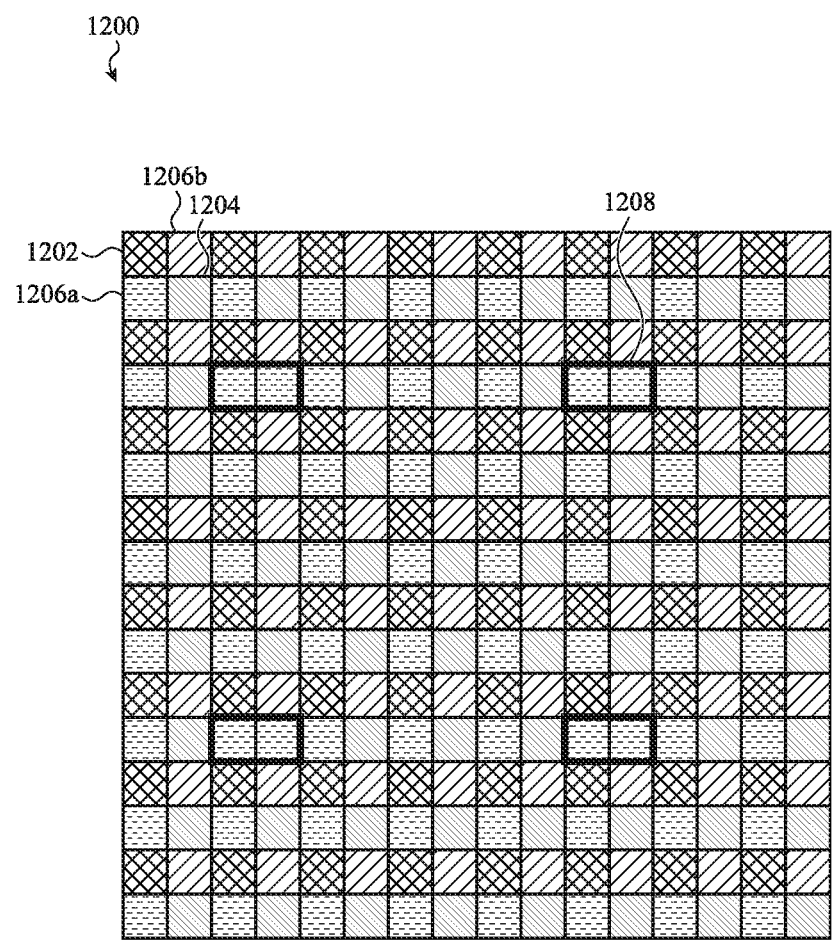
FIG. 12 shows an example distribution of symmetric and asymmetric pixels in a pixel array.

FIG. 12 shows an example distribution of symmetric and asymmetric pixels in a pixel array 1200. The pixels may include red symmetric pixels 1202, blue symmetric pixels 1204, and green symmetric pixels 1206a, 1206b arranged in accordance with a Bayer pattern (or alternatively, another pattern, or no pattern). Each of the symmetric pixels may be configured as described with reference to FIG. 3 or in other ways. Asymmetric pixels 1208 configured as described with reference to FIG. 11 may be interspersed with the symmetric pixels. By way of example, and in part because the pixel array 1200 includes more green pixels than red or blue pixels, each of the asymmetric pixels 1208 is associated with a green color filter. Of note, some of the blue pixels in the Bayer pattern are replaced by green pixels so that each pair of asymmetric pixels have the same color filter and sensitivity. The arrangement shown in FIG. 12 provides asymmetric pixels having sub-pixels with different directional asymmetries positioned adjacent one another within the pixel array.

Figure 13:
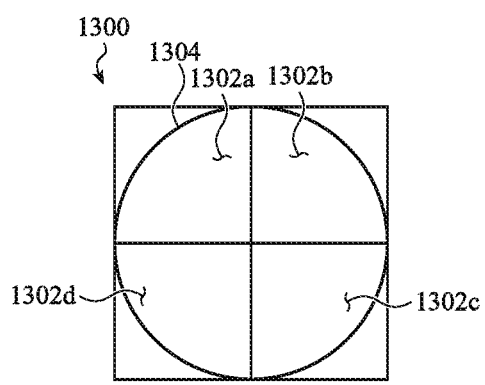
FIG. 13 shows a plan view of a pixel having four photodetectors (i.e., sub-pixels) positioned under a common microlens.

As shown in FIG. 13, the pixel cross-section described with reference to FIG. 11 may be duplicated in orthogonal directions to produce a pixel 1300 have four photodetectors 1302a, 1302b, 1302c, 1302d (i.e., sub-pixels) positioned under a common microlens 1304. Signals generated by the four photodetectors 1302 may be output separately and used separately. Alternatively, the signals may be output separately and summed by an asymmetric pixel processor in different ways. For example, signals output by the two left photodetectors 130a, 1302d may be summed, signals output by the two right photodetectors 1302b, 1302c may be summed, signals output by the two upper photodetectors 1302a, 1302b may be summed, or signals output by the two lower photodetectors 1302c, 1302d may be summed. The signals, either separately or combined in different manners, may provide indicators of image flare having different directionalities.

Similarly to the pixel described with reference to FIG. 11, the pixel 1300 is asymmetric because the curvature of the microlens 1304 bends light incident on different portions of the microlens 1304, and light incident on the microlens 1304 at different angles, in different directions, such that the four photodetectors 1302 receive different light based on their different positions under the microlens 1304. Charge integrated by each of the photodetectors 1302a, 1302b, 1302c, 1302d may be separately read out of the pixel 1300, or read out in pairs and summed, with the charges of individual pixels or sums of charges read from pixel pairs, being used as a pixel value of an asymmetric pixel. In some embodiments, the charges of all of the photodetectors 1302a, 1302b, 1302c, 1302d may be summed after readout, or alternatively summed during readout, to provide a combined pixel value for the pixel 1300.

Figure 14:
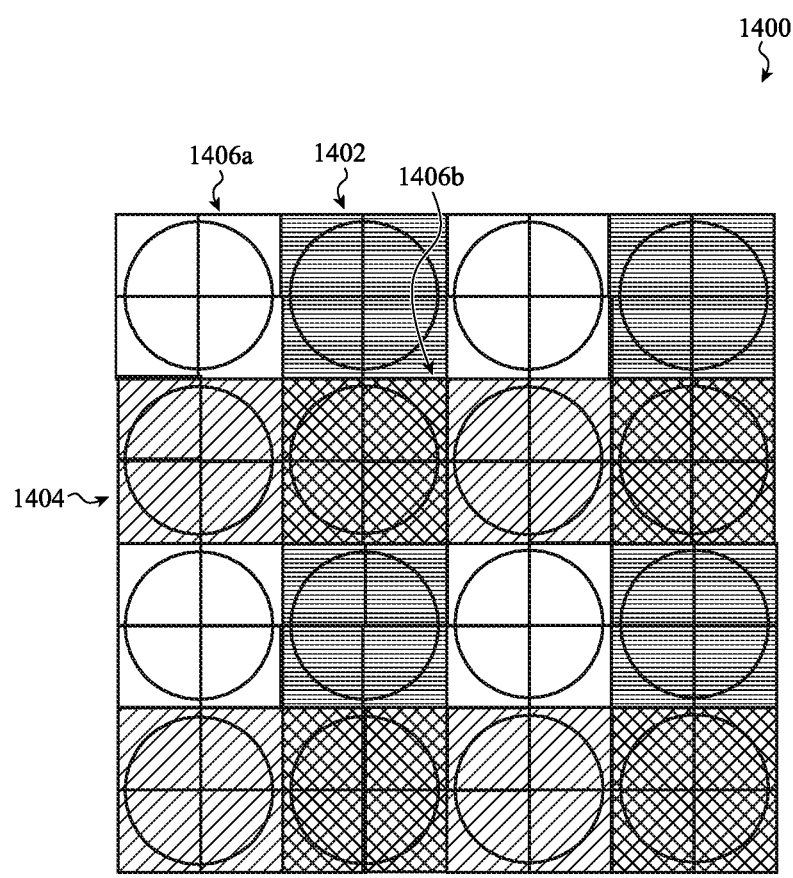
FIG. 14 shows an example distribution of asymmetric pixels in a pixel array.

FIG. 14 shows an example distribution of asymmetric pixels in a pixel array 1400. The pixels may include red asymmetric pixels 1402, blue asymmetric pixels 1404, and green asymmetric pixels 1404a, 1404b arranged in accordance with a Bayer pattern (or alternatively, another pattern, or no pattern). Each of the pixels may be configured as described with reference to FIG. 13 and include sub-pixels with different directional asymmetries positioned adjacent one another within the pixel array 1400.

Figure 15:
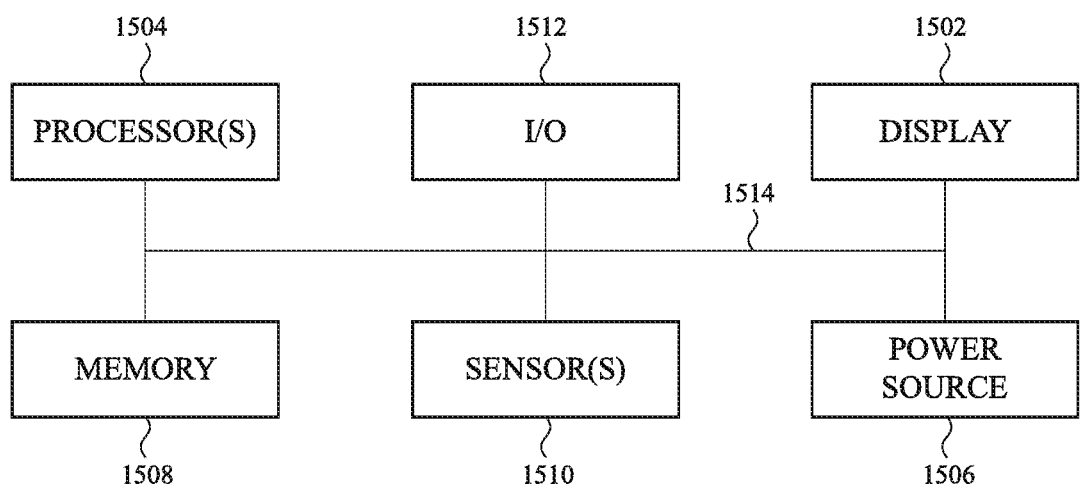
FIG. 15 shows a sample electrical block diagram of an electronic device.

FIG. 15 shows a sample electrical block diagram of an electronic device 1500, which may be the electronic device described with reference to FIGS. 1A & 1B. The electronic device 1500 may include a display 1502 (e.g., a light-emitting display), a processor 1504, a power source 1506, a memory 1508 or storage device, a sensor 1510, and an input/output (I/O) mechanism 1512 (e.g., an input/output device and/or input/output port). The processor 1504 may control some or all of the operations of the electronic device 1500. The processor 1504 may communicate, either directly or indirectly, with substantially all of the components of the electronic device 100. For example, a system bus or other communication mechanism 1514 may provide communication between the processor 1504, the power source 1506, the memory 1508, the sensor 1510, and/or the input/output mechanism 1512.

The processor 1504 may be implemented as any electronic device capable of processing, receiving, or transmitting data or instructions. For example, the processor 1504 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

It should be noted that the components of the electronic device 1500 may be controlled by multiple processors. For example, select components of the electronic device 1500 may be controlled by a first processor and other components of the electronic device 1500 may be controlled by a second processor, where the first and second processors may or may not be in communication with each other. In some embodiments, the processor 1504 may include in the image processor described with reference to FIG. 2.

The power source 1506 may be implemented with any device capable of providing energy to the electronic device 1500. For example, the power source 1506 may be one or more batteries or rechargeable batteries. Additionally or alternatively, the power source 1506 may be a power connector or power cord that connects the electronic device 1500 to another power source, such as a wall outlet.

The memory 1508 may store electronic data that may be used by the electronic device 1500. For example, the memory 1508 may store electrical data or content such as, for example, audio and video files, documents and applications, device settings and user preferences, timing signals, control signals, data structures or databases, image data, or focus settings. The memory 1508 may be configured as any type of memory. By way of example only, the memory 1508 may be implemented as random access memory, read-only memory, Flash memory, removable memory, other types of storage elements, or combinations of such devices.

The electronic device 1500 may also include one or more sensors 1510 positioned substantially anywhere on the electronic device 1500. The sensor(s) 1510 may be configured to sense substantially any type of characteristic, such as but not limited to, pressure, light, touch, heat, movement, relative motion, biometric data, and so on. For example, the sensor(s) 1510 may include a heat sensor, a position sensor, a light or optical sensor, an accelerometer, a pressure transducer, a gyroscope, a magnetometer, a health monitoring sensor, and so on. Additionally, the one or more sensors 1510 may utilize any suitable sensing technology, including, but not limited to, capacitive, ultrasonic, resistive, optical, ultrasound, piezoelectric, and thermal sensing technology.

The I/O mechanism 1512 may transmit and/or receive data from a user or another electronic device. An I/O device may include a display, a touch sensing input surface such as a track pad, one or more buttons (e.g., a graphical user interface "home" button), one or more cameras (e.g., the cameras described with reference to FIGS. 1A & 1B), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A method for processing an image, comprising:
obtaining a set of pixel values captured from a pixel array during an image capture frame, the set of pixel values including pixel values for a set of asymmetric pixels having different directional asymmetries;
detecting, using the pixel values for at least the asymmetric pixels and the different directional asymmetries of the asymmetric pixels, a directionality of image flare; and
processing an image defined by the set of pixel values in accordance with the detected directionality of image flare.

2. The method of claim 1, further comprising:
evaluating the pixel values for at least the set of asymmetric pixels to identify a region of the pixel array affected by the detected directionality of image flare;
wherein, the processing of the image in accordance with the detected directionality of image flare is concentrated on the identified region.

3. The method of claim 2, wherein the directionality of image flare is a first directionality of image flare, the method further comprising:
detecting, using the pixel values for at least the asymmetric pixels and the different directional asymmetries of the asymmetric pixels, a second directionality of image flare;
evaluating the pixel values for at least the set of asymmetric pixels to identify a second region of the pixel array affected by the detected second directionality of image flare; and
processing the image in accordance with the detected second directionality of image flare.

4. The method of claim 1, wherein the processing of the image in accordance with the detected directionality of image flare comprises directionally mitigating an effect of image flare.

5. The method of claim 1, wherein evaluating the pixel values for at least the set of asymmetric pixels to identify a region of the pixel array affected by the detected directionality of image flare comprises:
comparing,
a first set of the pixel values for a first set of the asymmetric pixels having a first directional asymmetry; to
a second set of the pixel values for a second set of the asymmetric pixels having a second directional asymmetry.

6. The method of claim 1, wherein:
the set of pixels is a first set of pixel values;
the method further comprises obtaining a second set of pixel values captured from the pixel array during the image capture frame, the second set of pixel values including pixel values for a set of symmetric pixels; and
evaluating the pixel values for at least the set of asymmetric pixels to identify a region of the pixel array affected by the detected directionality of image flare comprises comparing the pixel values for the asymmetric pixels to the pixel values for the symmetric pixels.

7. An electronic device, comprising:
a pixel array comprising asymmetric pixels having different directional asymmetries;
a processor configured to:
obtain a set of pixel values captured from the pixel array during an image capture frame, the set of pixel values including pixel values for the asymmetric pixels;
evaluate the pixel values for at least the asymmetric pixels to identify a region of the pixel array affected by image flare; and
detect, using the pixel values for at least the asymmetric pixels and the different directional asymmetries of the asymmetric pixels, a directionality of image flare.

8. The electronic device of claim 7, wherein the asymmetric pixels comprise:
a first set of asymmetric pixels distributed across the imaging pixel array and having a first directional asymmetry; and
a second set of asymmetric pixels distributed across the imaging pixel and having a second directional asymmetry different from the first directional asymmetry.

9. The electronic device of claim 8, wherein the second directional asymmetry is orthogonal to the first directional asymmetry.

10. The electronic device of claim 8, wherein:
the first directional asymmetry is configured to restrict light received by the first set of asymmetric pixels to a first subset of incident angles; and
the second directional asymmetry is configured to restrict light received by the second set of asymmetric pixels to a second subset of incident angles that differs from the first subset of incident angles.

11. The electronic device of claim 10, wherein the asymmetric pixels further comprise:
a third set of asymmetric pixels distributed across the imaging array and having a third directional asymmetry; and
a fourth set of asymmetric pixels distributed across the imaging array and having a fourth directional asymmetry ase that differs from the third directional asymmetry;
wherein, the third and fourth directional asymmetries are orthogonal to the first and second directional asymmetries, respectively.

12. The electronic device of claim 7, wherein the processor is configured to: classify an image captured during the image capture frame using at least the detected directionality of image flare.

13. The electronic device of claim 12, wherein the processor is configured to:
quantify an amount of image flare per asymmetric pixel; and
further classify the image using the identified region affected by image flare and the amount of image flare per asymmetric pixel.

14. The electronic device of claim 12, wherein the processor is configured to keep or alternatively discard the image in response to the classification of the image.

15. The electronic device of claim 12, wherein the processor is configured to:
perform the obtaining, evaluating, detecting, and classifying for each image in a set of images obtained during a set of image capture frames;
rank the images using the classifications of the images; and select, from among the ranked images, one or more of the images to keep or flag.

16. The electronic device of claim 12, wherein the processor is configured to: process the image in accordance with the classification of the image.

17. The electronic device of claim 7, wherein the processor is configured to:

detect, using the set of pixel values and the different directional asymmetries of the asymmetric pixels, whether a cause of image flare associated with the detected directionality is within or outside a scene imaged by the pixel array during the image capture frame.

18. An imaging system, comprising:

a pixel array, comprising:

a first set of asymmetric pixels distributed across the pixel array and having a first directional asymmetry;

a second set of asymmetric pixels distributed across the pixel array and having a second directional asymmetry different from the first directional asymmetry; and a processor configured to:

determine that a first set of pixel values obtained from the first set of asymmetric pixels, during an image capture frame, satisfies an image flare threshold; and evaluate a second set of pixel values obtained from the second set of asymmetric pixels, during the image capture frame, to determine whether the first set of pixel values is indicative of image flare or noise in an image captured by the pixel array during the image capture frame.

19. The imaging system of claim 18, wherein the processor is configured to evaluate the second set of pixel values by determining whether the second set of pixel values satisfy the image flare threshold.

20. The imaging system of claim 18, wherein the processor is configured to evaluate the second set of pixel values by comparing the second set of pixel values to the first set of pixel values.

21. The imaging system of claim 18, wherein the processor is configured to evaluate the second set of pixels values by determining whether the second set of pixel values satisfy an image flare confirmation threshold.

22. The imaging system of claim 18, wherein the processor is configured to: identify a plurality of regions of the pixel array; and identify the first and second sets of pixel values as pixel values obtained from asymmetric pixels in a same region of the plurality of region.

23. The imaging system of claim 18, wherein the processor is configured to process the image, responsive to determining the first set of pixel values is indicative of image flare, to reduce an effect of image flare on the image.

24. The imaging system of claim 18, wherein the processor is configured to process the image, responsive to determining the first set of pixel values is indicative of image flare, to accentuate an effect of image flare on the image.

25. The imaging system of claim 18, wherein the second directional asymmetry is orthogonal to the first directional asymmetry.

* * * * *